United States Patent
Ito

(10) Patent No.: US 12,428,549 B2
(45) Date of Patent: Sep. 30, 2025

(54) HETEROPHASIC PROPYLENE POLYMERIZATION MATERIAL AND OLEFIN POLYMER

(71) Applicant: SUMITOMO CHEMICAL COMPANY, LIMITED, Tokyo (JP)

(72) Inventor: Masaki Ito, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 440 days.

(21) Appl. No.: 18/064,307

(22) Filed: Dec. 12, 2022

(65) Prior Publication Data

US 2023/0227641 A1    Jul. 20, 2023

(30) Foreign Application Priority Data

Jan. 14, 2022    (JP) ................. 2022-004148

(51) Int. Cl.
  C08L 23/12      (2006.01)
  C08F 255/02     (2006.01)
  C08L 23/0807    (2025.01)
  C08F 110/06     (2006.01)

(52) U.S. Cl.
  CPC ............ *C08L 23/12* (2013.01); *C08F 255/02* (2013.01); *C08L 23/0815* (2013.01); *C08F 110/06* (2013.01); *C08L 2205/025* (2013.01); *C08L 2205/035* (2013.01); *C08L 2308/00* (2013.01)

(58) Field of Classification Search
  None
  See application file for complete search history.

(56) References Cited

U.S. PATENT DOCUMENTS

| | | | |
|---|---|---|---|
| 2010/0190942 A1 | 7/2010 | Hosaka et al. | |
| 2012/0053310 A1 | 3/2012 | Hosaka et al. | |
| 2016/0272740 A1 | 9/2016 | Wang et al. | |
| 2018/0298177 A1* | 10/2018 | Fukuroda | C08L 23/12 |

FOREIGN PATENT DOCUMENTS

| | | | |
|---|---|---|---|
| EP | 0283011 A2 | 9/1988 | |
| EP | 2636688 A1 | 9/2013 | |
| EP | 2963063 A1 | 1/2016 | |
| EP | 3015503 A1 | 5/2016 | |
| JP | H0693062 A | 4/1994 | |
| JP | H06 128450 A | 5/1994 | |
| JP | H11100421 A | 4/1999 | |
| JP | 2011184537 A | 9/2011 | |
| JP | 2016537462 A | 12/2016 | |
| JP | 2018532863 A | 11/2018 | |
| WO | 2012060361 A1 | 5/2012 | |
| WO | WO-2015091810 A1 * | 6/2015 | ............ C08L 23/12 |
| WO | 2018025862 A1 | 2/2018 | |

OTHER PUBLICATIONS

Extended European Search Report issued on Aug. 21, 2023, by the European Patent Office in corresponding European Application No. 22213534.5 (14 pages).

* cited by examiner

*Primary Examiner* — Eli D. Strah
(74) *Attorney, Agent, or Firm* — Panitch Schwarze Belisario & Nadel LLP

(57) ABSTRACT

Provided are a heterophasic propylene polymerization material and an olefin polymer having a small high-boiling-point component amount index (FOG). The heterophasic propylene polymerization material satisfies the following formula (3): $(X2 \times Y2)/Z2 \leq 7.0$ (3) wherein X2 represents a cold xylene soluble component amount (mass %) of the heterophasic propylene polymerization material; Y2 represents a percentage (%) of a component having a molecular weight of 104.0 or less in terms of polystyrene and contained in a cold xylene soluble component of the heterophasic propylene polymerization material based on all components of the cold xylene soluble component of the heterophasic propylene polymerization material as measured by gel permeation chromatography; and Z2 represents a content (mass %) of a propylene-based copolymer contained in the heterophasic propylene polymerization material and containing a propylene-derived monomer unit and a monomer unit derived from at least one compound selected from the group consisting of ethylene and C4-12 α-olefins.

9 Claims, No Drawings

HETEROPHASIC PROPYLENE POLYMERIZATION MATERIAL AND OLEFIN POLYMER

BACKGROUND OF THE INVENTION

Field of the Invention

The present invention relates to a heterophasic propylene polymerization material and an olefin polymer produced using a novel Ziegler-Natta catalyst in which a solid catalyst component and an external electron donor are combined.

Description of the Related Art

Conventionally, a large number of olefin polymerization catalysts have been proposed, and a wide variety of olefin-based polymers have been produced.

For example, WO-A-2018/025862 describes an olefin-based polymer produced using a specific catalyst.

SUMMARY OF THE INVENTION

The olefin-based polymer to be produced preferably has a low resin odor from the viewpoint of environment, health, and so on. However, WO-A-2018/025862 does not mention a resin odor related to a heterophasic propylene polymerization material or an olefin polymer.

In view of such a situation, the present invention addresses the problem of providing a heterophasic propylene polymerization material and an olefin polymer having a small high-boiling-point component amount index (FOG). The heterophasic propylene polymerization material and the olefin polymer of the present invention have a low resin odor because the high-boiling-point component is a source of resin odor.

The present inventors have conducted intensive research in view of such a background, and have completed the present invention.

Specifically, the present invention provides the following items of the present invention.

[1]

A heterophasic propylene polymerization material that satisfies the following formula (3):

$$(X2 \times Y2)/Z2 \leq 7.0 \quad (3)$$

wherein

X2 represents a cold xylene soluble component amount (mass %) of the heterophasic propylene polymerization material;

Y2 represents a percentage (%) of a component having a molecular weight of $10^{4.0}$ or less in terms of polystyrene and contained in a cold xylene soluble component of the heterophasic propylene polymerization material based on all components of the cold xylene soluble component of the heterophasic propylene polymerization material as measured by gel permeation chromatography; and Z2 represents a content (mass %) of a propylene-based copolymer contained in the heterophasic propylene polymerization material and containing a propylene-derived monomer unit and a monomer unit derived from at least one compound selected from the group consisting of ethylene and $C_{4-12}$ α-olefins.

[2]

The heterophasic propylene polymerization material according to [1], which satisfies the following formula (4):

$$0.3 < (X2 \times Y2)/Z2 < 7.0 \quad (4)$$

wherein X2, Y2, and Z2 have the same meanings as described above.

[3]

The heterophasic propylene polymerization material according to [1] or [2], comprising:

(a) a propylene-based polymer containing 80 mass % or more of propylene-derived monomer unit and having an intrinsic viscosity of 2.0 dL/g or less; and (b) a propylene-based copolymer containing a propylene-derived monomer unit and 30 to 55 mass % of a monomer unit derived from at least one compound selected from the group consisting of ethylene and $C_{4-12}$ α-olefins and having an intrinsic viscosity of from 1.5 to 8.0 dL/g.

[4]

The heterophasic propylene polymerization material according to [3], wherein the propylene-based polymer (a) has a content of from 50 to 90 mass %, and the propylene-based copolymer (b) has a content of from 10 to 50 mass %.

[5]

The heterophasic propylene polymerization material according to [3] or [4], wherein the propylene-based polymer (a) has an isotactic pentad fraction of more than 0.975.

[6]

An olefin polymer that satisfies the following formula (1):

$$Y1/X1 \leq 40 \quad (1)$$

wherein

X1 represents a cold xylene soluble component amount (mass %) of the olefin polymer; and Y1 represents a percentage (%) of a component having a molecular weight of $10^{3.5}$ or less in terms of polystyrene and contained in a cold xylene soluble component of the olefin polymer based on all components of the cold xylene soluble component of the olefin polymer as measured by gel permeation chromatography.

[7]

The olefin polymer according to [6], which satisfies the following formula (2):

$$5.3 < Y1/X1 < 40 \quad (2)$$

wherein X1 and Y1 have the same meanings as described above.

[8]

The olefin polymer according to [6] or [7], which is a propylene polymer.

[9]

The olefin polymer according to [8], which is a propylene homopolymer.

The present invention is characterized in that a heterophasic propylene polymerization material or an olefin polymer produced using a novel Ziegler-Natta catalyst, in which a solid catalyst component and an external electron donor are combined, has a small high-boiling-point component amount index (FOG). The heterophasic propylene polymerization material and the olefin polymer of the present invention have a low resin odor because the high-boiling-point component is a source of resin odor. Further, the olefin polymer of the present invention does not have an increased melting point although the high-boiling-point component amount index is small. The small high-boiling-point component amount index and the low melting point are in a trade-off relationship, but, for example, the low-temperature heat sealing performance is maintained in the olefin polymer of the present invention.

DETAILED DESCRIPTION OF THE PREFERRED EMBODIMENTS

Definitions

As used herein, the term "α-olefin" means an aliphatic unsaturated hydrocarbon having a carbon-carbon unsaturated double bond at the α-position.

As used herein, the term "heterophasic propylene polymerization material" means a mixture structured by dispersing a propylene copolymer containing a propylene-derived monomer unit and a monomer unit derived from at least one α-olefin selected from the group consisting of ethylene and $C_{4-12}$ α-olefins in a matrix of a propylene-based polymer containing 80 mass % or more of propylene-derived monomer unit (provided that the propylene-based polymer has a total mass of 100 mass %).

Hereinafter, several embodiments of the present invention will be described in detail. However, the present invention is not limited to the following embodiments. Note that as used herein, the description of "from lower limit to upper limit" representing a numerical range means "lower limit or more and upper limit or less", and the description of "from upper limit to lower limit" means "upper limit or less and lower limit or more". That is, these descriptions each define a numerical range encompassing an upper limit and a lower limit inclusive.

[Heterophasic Propylene Polymerization Material]

The heterophasic propylene polymerization material of the present invention is a heterophasic propylene polymerization material satisfying the following formula (3):

$$(X2 \times Y2)/Z2 \leq 7.0 \quad (3)$$

wherein

X2 represents a cold xylene soluble component amount (mass %) of the heterophasic propylene polymerization material;

Y2 represents a percentage (%) of a component having a molecular weight of $10^{4.0}$ or less in terms of polystyrene and contained in a cold xylene soluble component of the heterophasic propylene polymerization material based on all components of the cold xylene soluble component of the heterophasic propylene polymerization material as measured by gel permeation chromatography; and Z2 represents a content (mass %) of a propylene-based copolymer contained in the heterophasic propylene polymerization material and containing a propylene-derived monomer unit and a monomer unit derived from at least one compound selected from the group consisting of ethylene and $C_{4-12}$ α-olefins.

The heterophasic propylene polymerization material of the present invention is preferably a heterophasic propylene polymerization material satisfying the following formula (4):

$$0.3 < (X2 \times Y2)/Z2 < 7.0 \quad (4)$$

wherein X2, Y2, and Z2 have the same meanings as described above.

The heterophasic propylene polymerization material of the present invention more preferably comprises:

(a) a propylene-based polymer containing 80 mass % or more of propylene-derived monomer unit and having an intrinsic viscosity of 2.0 dL/g or less; and (b) a propylene-based copolymer containing a propylene-derived monomer unit and 30 to 55 mass % of a monomer unit derived from at least one compound selected from the group consisting of ethylene and $C_{4-12}$ α-olefins and having an intrinsic viscosity of from 1.5 to 8.0 dL/g.

The heterophasic propylene polymerization material of the present invention is still more preferably the above heterophasic propylene polymerization material in which the propylene-based polymer (a) has a content of from 50 to 90 mass % and the propylene-based copolymer (b) has a content of from 10 to 50 mass %.

The intrinsic viscosity ([η], unit: dL/g) is herein measured by the procedure described in the Examples below.

The propylene-based polymer (a) may have an intrinsic viscosity of from 0.3 to 1.2 dL/g, from 0.4 to 1.0 dL/g, or from 0.8 to 0.95 dL/g.

The propylene-based polymer (a) may be, for example, a propylene homopolymer or may contain a monomer unit derived from a monomer other than propylene. When the propylene-based polymer (a) contains a monomer unit derived from a monomer other than propylene, the content thereof may be, for example, 0.01 mass % or more and less than 20 mass % based on the total mass of the propylene-based polymer (a).

Examples of the monomer other than propylene include ethylene or a $C_{4-12}$ α-olefin. Among them, at least one compound selected from the group consisting of ethylene and $C_{4-10}$ α-olefins is preferable, at least one compound selected from the group consisting of ethylene, 1-butene, 1-hexene, and 1-octene is more preferable, and at least one selected from the group consisting of ethylene and 1-butene is still more preferable.

Examples of the propylene-based polymer containing a monomer unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, or a propylene-ethylene-1-octene copolymer.

From the viewpoint of the rigidity of molding, the propylene-based polymer (a) is preferably a propylene homopolymer, a propylene-ethylene copolymer, a propylene-1-butene copolymer, or a propylene-ethylene-1-butene copolymer, and more preferably a propylene homopolymer.

The heterophasic propylene polymerization material of this embodiment may contain only one kind or two or more kinds of the propylene-based polymer (a).

The propylene-based copolymer (b) may have an intrinsic viscosity of from 2.0 to 10.0 dL/g, from 3.0 to 9.0 dL/g, or from 4.0 to 8.0 dL/g.

In the propylene-based copolymer (b), the monomer unit derived from at least one α-olefin selected from the group consisting of ethylene and $C_{4-12}$ α-olefins may have a content of from 20 to 50 mass %, from 30 to 45 mass %, or from 35 to 40 mass %.

In the propylene-based copolymer (b), as at least one α-olefin selected from the group consisting of ethylene and $C_{4-12}$ α-olefins, at least one compound selected from the group consisting of ethylene and $C_{4-10}$ α-olefins is preferable, at least one compound selected from the group consisting of ethylene, 1-butene, 1-hexene, 1-octene, and 1-decene is more preferable, and at least one selected from the group consisting of ethylene and 1-butene is still more preferable.

Examples of the propylene-based copolymer (b) include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer, or a propylene-1-decene copolymer. Among them, as the propylene-based copolymer (b), a propylene-ethylene copolymer, a propylene-1-butene copolymer, or a propylene-ethylene-1-butene copolymer is preferable, and a propylene-ethylene copolymer is more preferable.

The heterophasic propylene polymerization material of this embodiment may contain only one kind or two or more kinds of the propylene-based copolymer (b).

Examples of the heterophasic propylene polymerization material according to this embodiment include: a (propylene)-(propylene-ethylene) polymerization material, a (propylene)-(propylene-ethylene-1-butene) polymerization material, a (propylene)-(propylene-ethylene-1-hexene) polymerization material, a (propylene)-(propylene-ethylene-1-octene) polymerization material, a (propylene)-(propylene-1-butene) polymerization material, a (propylene)-(propylene-1-hexene) polymerization material, a (propylene)-(propylene-1-octene) polymerization material, a (propylene)-(propylene-1-decene) polymerization material, a (propylene-ethylene)-(propylene-ethylene) polymerization material, a (propylene-ethylene)-(propylene-ethylene-1-butene) polymerization material, a (propylene-ethylene)-(propylene-ethylene-1-hexene) polymerization material, a (propylene-ethylene)-(propylene-ethylene-1-octene) polymerization material, a (propylene-ethylene)-(propylene-ethylene-1-decene) polymerization material, a (propylene-ethylene)-(propylene-1-butene) polymerization material, a (propylene-ethylene)-(propylene-1-hexene) polymerization material, a (propylene-ethylene)-(propylene-1-octene) polymerization material, a (propylene-ethylene)-(propylene-1-decene) polymerization material, a (propylene-1-butene)-(propylene-ethylene) polymerization material, a (propylene-1-butene)-(propylene-ethylene-1-butene) polymerization material, a (propylene-1-butene)-(propylene-ethylene-1-hexene) polymerization material, a (propylene-1-butene)-(propylene-ethylene-1-octene) polymerization material, a (propylene-1-butene)-(propylene-ethylene-1-decene) polymerization material, a (propylene-1-butene)-(propylene-1-butene) polymerization material, a (propylene-1-butene)-(propylene-1-hexene) polymerization material, a (propylene-1-butene)-(propylene-1-octene) polymerization material, a (propylene-1-butene)-(propylene-1-decene) polymerization material, a (propylene-1-hexene)-(propylene-1-hexene) polymerization material, a (propylene-1-hexene)-(propylene-1-octene) polymerization material, a (propylene-1-hexene)-(propylene-1-decene) polymerization material, a (propylene-1-octene)-(propylene-1-octene) polymerization material, or a (propylene-1-octene)-(propylene-1-decene) polymerization material. Among them, a (propylene)-(propylene-ethylene) polymerization material, a (propylene)-(propylene-ethylene-1-butene) polymerization material, a (propylene-ethylene)-(propylene-ethylene) polymerization material, a (propylene-ethylene)-(propylene-ethylene-1-butene) polymerization material, or a (propylene-1-butene)-(propylene-1-butene) polymerization material is preferable, and a (propylene)-(propylene-ethylene) polymerization material is more preferable.

Here, the above description indicates "(Type of propylene-based polymer containing 80 mass % or more of propylene-derived monomer unit)-(Type of propylene-based copolymer (b))". That is, the description of "(propylene)-(propylene-ethylene) polymerization material" means a "heterophasic propylene polymerization material in which the propylene-based polymer (a) is a propylene homopolymer and the propylene-based copolymer (b) is a propylene-ethylene copolymer". The same applies to other analogous expressions.

The propylene-based polymer (a) and the propylene-based copolymer (b) have a content of from 50 to 90 mass % and from 10 to 50 mass %, respectively, while the total mass of the heterophasic propylene polymerization material is set to 100 mass %.

In the heterophasic propylene polymer material of this embodiment, from the viewpoint of dimensional stability, it is preferable that the propylene-based polymer (a) has an intrinsic viscosity of from 0.3 to 1.2 dL/g and the propylene-based copolymer (b) has an intrinsic viscosity of from 2.0 to 10.0 dL/g; the monomer unit derived from at least one α-olefin selected from the group consisting of ethylene and $C_{4-12}$ α-olefins in the propylene-based copolymer (b) has a content of from 20 to 50 mass %; and the propylene-based polymer (a) and the propylene-based copolymer (b) have a content of from 50 to 90 mass % and from 10 to 50 mass %, respectively, while the total mass of the heterophasic propylene polymer material is set to 100 mass %.

The propylene-based polymer (a) contained in the heterophasic propylene polymerization material has an isotactic pentad fraction (also referred to as [mmmm]) of preferably 0.950 or higher, more preferably 0.970 or higher, and still more preferably higher than 0.975 from the viewpoint of the rigidity and dimensional stability of molding formed of the resin composition. The isotactic pentad fraction of the component (a) may be, for example, 1.000 or less. A polymer having an isotactic pentad fraction close to 1 is considered to have high tacticity of the molecular structure and high crystallinity.

The isotactic pentad fraction means an isotactic fraction in a pentad unit. That is, the isotactic pentad fraction indicates the content ratio of a structure in which five consecutive propylene-derived monomer units, namely a pentad unit, are bonded in the meso configuration. Note that when the target component is a copolymer, the term refers to a value measured for a chain of propylene-derived monomer units.

The isotactic pentad fraction is herein measured by the procedure described in the Examples below.

To the heterophasic propylene polymerization material may be optionally added an additive(s) such as a heat stabilizer, a UV stabilizer, an antioxidant, a crystal nucleating agent, a lubricant, a colorant, an antiblocking agent, an antistatic agent, an antifogging agent, a flame retardant, a petroleum resin, a foaming agent, a foaming aid, and/or an organic or inorganic filler. The amount of additive(s) added is preferably 0.01 mass % or more and 30 mass % or less based on the entire heterophasic propylene polymerization material. The additives may be used singly, or two or more thereof may be used in combination at a given ratio.

<Olefin Polymer>

The olefin polymer of the present invention is an olefin polymer that satisfies the following formula (1):

$$Y1/X1 \leq 40 \qquad (1)$$

wherein

X1 represents a cold xylene soluble component amount (mass %) of the olefin polymer; and Y1 represents a percentage (%) of a component having a molecular weight of $10^{3.5}$ or less in terms of polystyrene and contained in a cold xylene soluble component of the olefin polymer based on all components of the cold xylene soluble component of the olefin polymer as measured by gel permeation chromatography.

The olefin polymer of the present invention is an olefin polymer that satisfies the following formula (2):

$$5.3 < Y1/X1 < 40 \quad (2)$$

wherein X1 and Y1 have the same meanings as described above.

Examples of the olefin include ethylene or an α-olefin having 3 or more carbon atoms. Examples of the α-olefin include: a linear monoolefin (e.g., as propylene, 1-butene, 1-pentene, 1-hexene, 1-heptene, 1-octene, or 1-decene); a branched monoolefin (e.g., 3-methyl-1-butene, 3-methyl-1-pentene, 4-methyl-1-pentene); a cyclic monoolefin (e.g., vinylcyclohexane); or a combination of two or more kinds thereof. Among them, ethylene or a propylene homopolymer or an olefin copolymer containing a plurality of types of olefins having ethylene or propylene as a main component is preferable. The plurality of olefins described above may be used in combination, for example, two or more kinds of olefins may be used in combination. An olefin and a polyunsaturated compound, such as a conjugated diene or a non-conjugated diene, may be used in combination.

The olefin polymer of the present invention is preferably an ethylene homopolymer, a propylene homopolymer, a 1-butene homopolymer, a 1-pentene homopolymer, a 1-hexene homopolymer, an ethylene-propylene copolymer, an ethylene-1-butene copolymer, an ethylene-1-hexene copolymer, a propylene-1-butene copolymer, a propylene-1-hexene copolymer, an ethylene-propylene-1-butene copolymer, an ethylene-propylene-1-hexene copolymer, or a polymer obtained by multistage polymerization thereof. The olefin polymer of the present invention is more preferably a propylene polymer, and still more preferably a propylene homopolymer.

The olefin polymer may have an intrinsic viscosity of from 0.3 to 8.0 dL/g, from 0.5 to 5.0 dL/g, or from 0.7 to 3.0 dL/g.

To the olefin polymer may be optionally added an additive(s) such as a heat stabilizer, a UV stabilizer, an antioxidant, a crystal nucleating agent, a lubricant, a colorant, an antiblocking agent, an antistatic agent, an antifogging agent, a flame retardant, a petroleum resin, a foaming agent, a foaming aid, and/or an organic or inorganic filler. The amount of additive (s) added is preferably 0.01 mass % or more and 30 mass % or less based on the entire olefin polymer. The additives may be used singly, or two or more thereof may be used in combination at a given ratio.

<Solid Catalyst Component for Olefin Polymerization>

The heterophasic propylene polymerization material and the olefin polymer of the present invention can be preferably produced by the following production method comprising the steps of:

bringing a component (A), a component (B), and a component (C) into contact with one another to obtain an olefin polymerization catalyst; and polymerizing an olefin in the presence of the olefin polymerization catalyst to produce a heterophasic propylene polymerization material or an olefin polymer, wherein the component (A) is an solid catalyst component for olefin polymerization containing a titanium atom, a magnesium atom, a halogen atom, and an internal electron donor;

the component (B) is an organoaluminum compound; and the component (C) is a silicon compound represented by the following formula (i) or (ii):

$$R^1 Si(OR^2)_3 \quad (i)$$

where $R^1$ is a $C_{1-20}$ hydrocarbyl group or a hydrogen atom and $R^2$ is a $C_{1-20}$ hydrocarbyl group or $$R^3{}_2 Si(NR^4 R^5)_2 \quad (ii)$$

where $R^3$ is a $C_{1-20}$ hydrocarbyl group or a hydrogen atom and $R^4$ and $R^5$ are each a $C_{1-12}$ hydrocarbyl group or a hydrogen atom.

As used herein, the wording "solid catalyst component for olefin polymerization" means an olefin polymerization catalyst that is present as a solid content at least in toluene and is produced by using, in combination, an olefin polymerization catalyst aid such as an organoaluminum compound.

Part or all of the titanium atoms in the solid catalyst component for olefin polymerization are derived from a titanium halide compound. Part or all of the halogen atoms in the solid catalyst component for olefin polymerization are derived from a titanium halide compound.

Part or all of the magnesium atoms in the solid catalyst component for olefin polymerization are derived from a magnesium compound. The magnesium compound may be a magnesium atom-containing compound, and specific examples thereof include compounds represented by the following formulas (i) to (iii):

$$MgR^1{}_k X_{2-k} \quad (i)$$

$$Mg(OR^1)_m X_{2-m} \quad (ii)$$

$$MgX_2 \cdot n R^1 OH \quad (iii)$$

wherein k is a number satisfying 0≤k≤2; m is a number satisfying 0<m≤2; n is a number satisfying 0≤n≤3; $R^1$ is a $C_{1-20}$ hydrocarbyl group; and X is a halogen atom.

Examples of X in the above formulas (i) to (iii) include a chlorine atom, a bromine atom, an iodine atom, or a fluorine atom. Here, a chlorine atom is preferable. Each X may be the same or different.

Specific examples of the magnesium compound represented by any of the formulae (i) to (iii) include magnesium dialkoxide and magnesium halide.

The magnesium halide used may be a commercially available magnesium halide as it is. A precipitate generated by dropping a solution, which is obtained by dissolving a commercially available magnesium halide in alcohol, into a hydrocarbon liquid may be separated from the liquid and used. The magnesium halide may be produced based on the method described in U.S. Pat. No. 6,825,146, WO-A-1998/044009, WO-A-2003/000754, WO-A-2003/000757, or WO-A-2003/085006.

Examples of the method for producing magnesium dialkoxide include a method in which metallic magnesium and an alcohol are brought into contact with each other in the presence of a catalyst (e.g., JP-A-04-368391, JP-A-03-74341, JP-A-08-73388, WO-A-2013/058193). Examples of the alcohol include methanol, ethanol, propanol, butanol, or octanol. Examples of the catalyst include a halogen (e.g., iodine, chlorine, bromine); or a magnesium halide (e.g., magnesium iodide, magnesium chloride). Preferred is iodine.

The magnesium compound may be supported on a carrier. Examples of the carrier include a porous inorganic oxide (e.g., $SiO_2$, $Al_2O_3$, MgO, $TiO_2$, $ZrO_2$); or an organic porous polymer (e.g., polystyrene, a styrene-divinylbenzene copolymer, a styrene-ethylene glycol dimethacrylic acid copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, poly-vinyl chloride, polyethylene, polypropylene). Among them, a porous inorganic oxide is preferable, and $SiO_2$ is more preferable.

The carrier is preferably porous from the viewpoint of effectively immobilizing a magnesium compound on the carrier. More preferred is a porous carrier in which the total volume of pores having a pore radius of 10 to 780 nm determined by a mercury porosimetry according to the standard ISO 15901-1: 2005 is 0.3 cm³/g or more. Still more preferred is a porous carrier of 0.4 cm³/g or more. In addition, preferred is a porous carrier in which the total volume of pores having a pore radius of 10 to 780 nm is 25% or more of the total volume of pores having a pore radius of 2 to 100 μm. More preferred is a porous carrier in which the above rate is 30% or more.

The magnesium compounds may be used singly or two or more kinds thereof may be used in combination. The magnesium compound may be brought into contact with a titanium halide compound solution in the form of a magnesium compound slurry containing a magnesium compound and a solvent as long as the effects of the present invention are exerted, or may be brought into contact in a solvent-free form.

Part or all of the magnesium atoms in the solid catalyst component for olefin polymerization are derived from a magnesium compound. In addition, part of the halogen atoms in the solid catalyst component for olefin polymerization is derived from a magnesium compound.

The internal electron donor means an organic compound capable of donating an electron pair to one or more metal atoms contained in the solid catalyst component for olefin polymerization. Specific examples thereof include a monoester compound, a dicarboxylic acid ester compound, a diol diester compound, a β-alkoxy ester compound, or a diether compound.

In addition, the examples also include the internal electron donor described in JP-A-2011-246699.

Among them, a dicarboxylic acid ester compound, a diol diester compound, or a β-alkoxy ester compound is preferable. The internal electron donor may be used singly or two or more kinds thereof may be used in combination.

The solid catalyst component for olefin polymerization may be produced by the following method for producing an solid catalyst component for olefin polymerization, the method comprising:
step (I) of bringing a titanium halide compound into contact with a magnesium compound to obtain a slurry containing a solid product.

Preferably, in the method for producing an solid catalyst component for olefin polymerization, in step (I), the magnesium compound is added to the titanium halide compound-containing solution; the internal electron donor is at least one compound selected from the group consisting of a monoester compound, a dicarboxylic acid ester compound, a diol diester compound, a β-alkoxy ester compound, and a diether compound; and the magnesium compound is magnesium dialkoxide. The method may further comprise step (II) of adding an internal electron donor to the slurry containing the solid product.

<Olefin Polymerization Catalyst>

In one embodiment, the olefin polymerization catalyst may be produced by bringing the solid catalyst component for olefin polymerization into contact with an organoaluminum compound, for example, by a known procedure. Also, in another embodiment, the olefin polymerization catalyst may be produced by bringing the solid catalyst component for olefin polymerization into contact with an organoaluminum compound and an external electron donor.

As a result, in one embodiment, the olefin polymerization catalyst contains the solid catalyst component for olefin polymerization and an organoaluminum compound. Alternatively, in another embodiment, the olefin polymerization catalyst contains the solid catalyst component for olefin polymerization, an organoaluminum compound, and an external electron donor.

The organoaluminum compound is a compound having one or more carbon-aluminum bonds, and specific examples thereof include the compound described in JP-A-10-212319. Among them, preferred is trialkylaluminum, a mixture of trialkylaluminum and dialkylaluminum halide, or alkylalumoxane. More preferred is triethylaluminum, triiso-butyl-aluminum, a mixture of triethylaluminum and diethylaluminum chloride, or tetraethyldialumoxane.

Examples of the external electron donor can include each compound described in JP-B-2950168, JP-A-2006-96936, JP-A-2009-173870, or JP-A-2010-168545. Among them, an oxygen-containing compound or a nitrogen-containing compound is preferable. Examples of the oxygen-containing compound include alkoxysilicon, ether, ester, and ketone. Among them, alkoxysilicon or ether is preferable. Examples of the nitrogen-containing compound include aminosilicon, amine, imine, amide, imide, or cyan. Among them, aminosilicon is preferable.

The alkoxysilicon or the aminosilicon as the external electron donor is preferably a silicon compound of the following formula, wherein the component (C) is a silicon compound represented by the following formula (i) or (ii):

$$R^1Si(OR^2)_3 \quad (i)$$

where $R^1$ is a $C_{1-20}$ hydrocarbyl group or a hydrogen atom and $R^2$ is a $C_{1-20}$ hydrocarbyl group or

$$R^3{}_2Si(NR^4R^5)_2 \quad (ii)$$

where $R^3$ is a $C_{1-20}$ hydrocarbyl group or a hydrogen atom and $R^4$ and $R^5$ are each a $C_{1-12}$ hydrocarbyl group or a hydrogen atom.

Examples of the hydrocarbyl group of $R^1$ or $R^2$ in the above formula (i) include an alkyl group, an aralkyl group, an aryl group, or an alkenyl group. Examples of the alkyl group of $R^1$ or $R^2$ include a linear alkyl group (e.g., a methyl, ethyl, n-propyl, n-butyl, n-pentyl, n-hexyl, n-heptyl, or n-octyl group); a branched alkyl group (e.g., an iso-propyl, iso-butyl, tert-butyl, iso-pentyl, neopentyl, or 2-ethylhexyl group); or a cyclic alkyl group (e.g., a cyclopropyl, cyclobutyl, cyclopentyl, cyclohexyl, cycloheptyl, or cyclooctyl group). Preferred is a linear, branched, or cyclic $C_{1-20}$ alkyl group. Examples of the aralkyl group of $R^1$ or $R^2$ include a benzyl group or a phenethyl group, and a $C_{7-20}$ aralkyl group is preferable. Examples of the aryl group of $R^1$ or $R^2$ include a phenyl group, a tolyl group, or a xylyl group, and a $C_{6-20}$ aryl group is preferable. Examples of the alkenyl group of $R^1$ or $R^2$ include a linear alkenyl group (e.g., a vinyl, allyl, 3-butenyl, or 5-hexenyl group); a branched alkenyl group (e.g., an iso-butenyl or 5-methyl-3 pentenyl group); or a cyclic alkenyl group (e.g., a 2-cyclohexenyl or 3-cyclohexenyl group). Preferred is a $C_{2-10}$ alkenyl group.

Specific examples of the alkoxysilicon represented by the above formula (i) include phenyltrimethoxysilane, methyltriethoxysilane, ethyltriethoxysilane, n-propyltriethoxysilane, iso-butyltriethoxysilane, vinyltriethoxysilane, sec-butyltriethoxysilane, cyclohexyltriethoxysilane, cyclopentyltriethoxysilane, or benzyltriethoxysilane. Preferable examples include cyclohexyltriethoxysilane or triethoxyphenylsilane.

Examples of the hydrocarbyl group of $R^3$ in the above formula (ii) include the same groups as of the above formula $R^1$.

Examples of the hydrocarbyl group of $R^4$ or $R^3$ in the above formula (ii) include an alkyl group or an alkenyl group. Examples of the alkyl group of $R^4$ or $R^3$ include a linear alkyl group (e.g., a methyl, ethyl, n-propyl, n-butyl, n-pentyl, or n-hexyl group); a branched alkyl group (e.g., an iso-propyl, iso-butyl, tert-butyl, iso-pentyl, or neopentyl group); or a cyclic alkyl group (e.g., a cyclopropyl, cyclobutyl, cyclopentyl, or cyclohexyl group). Preferred is a $C_{1-6}$ linear alkyl group. Examples of the alkenyl group of $R^4$ or $R^5$ include a linear alkenyl group (e.g., a vinyl, allyl, 3-butenyl, or 5-hexenyl group); a branched alkenyl group (e.g., an iso-butenyl or 5-methyl-3 pentenyl group); or a cyclic alkenyl group (e.g., a 2-cyclohexenyl or 3-cyclohexenyl group). A linear $C_{2-6}$ alkenyl group is preferable, and a methyl group or an ethyl group is particularly preferable.

Specific examples of the aminosilicon represented by the above formula (ii) include bis(ethylamino)dicyclopentylsilane, bis(ethylamino)diisopropylsilane, or bis(methylamino)di-t-butylsilane. Preferable examples include bis(ethylamino)dicyclopentylsilane.

The aminosilicon described in WO-A-2006/129773 can also be exemplified.

The ether as the external electron donor is preferably a cyclic ether compound. The cyclic ether compound is a heterocyclic compound having at least one —C—O—C— bond in the ring structure, more preferably a cyclic ether compound having at least one —C—O—C—O—C— bond in the ring structure, and particularly preferably 1,3-dioxolane or 1,3-dioxane.

The external electron donor may be used singly or two or more kinds thereof may be used in combination.

The process of bringing the solid catalyst component for olefin polymerization into contact with an organoaluminum compound and an external electron donor is not particularly limited as long as the olefin polymerization catalyst can be generated. The contact is carried out in the presence or absence of a solvent. The contact mixture may be fed into a polymerization reactor; each component may be separately supplied to a polymerization reactor and brought into contact in the polymerization reactor; or the contact mixture of any two components and the rest components may be separately supplied to a polymerization reactor and brought into contact in the polymerization reactor.

The amount of organoaluminum compound used is usually from 0.01 to 1000 μmol and preferably from 0.1 to 500 μmol, based on 1 mg of the solid catalyst component for olefin polymerization.

The amount of the external electron donor used is usually from 0.0001 to 1000 μmol, preferably from 0.001 to 500 μmol, and more preferably from 0.01 to 150 μmol, based on 1 mg of the solid catalyst component for olefin polymerization.

As described below, the above olefin polymerization catalyst may be used for olefin polymerization to produce a polymer with a small high-boiling-point component amount index.

<How to Produce Olefin Polymer>

In the method for producing an olefin polymer according to the present invention, an olefin is polymerized in the presence of the above-described olefin polymerization catalyst.

In one embodiment, the method for forming an olefin polymerization catalyst may preferably include the following steps:

step (i) of polymerizing a small amount of olefin (the same as or different from an olefin used in major polymerization (usually referred to as main polymerization)) in the presence of an solid catalyst component for olefin polymerization and an organoaluminum compound (optionally with an external electron donor and/or a chain transfer agent such as hydrogen so as to adjust the molecular weight of olefin polymer to be produced) to produce a catalyst component, the surface of which is covered with a polymer of the olefin (this polymerization is usually referred to as prepolymerization, and thus the catalyst component is usually referred to as a prepolymerization catalyst component); and step (ii) of bringing the prepolymerization catalyst component into contact with the organoaluminum compound and the external electron donor.

The prepolymerization is preferably slurry polymerization using, as a solvent, inert hydrocarbon such as propane, butane, isobutane, pentane, isopentane, hexane, heptane, octane, cyclohexane, benzene, or toluene.

The amount of organoaluminum compound used in step (i) above is usually from 0.5 mol to 700 mol, preferably from 0.8 mol to 500 mol, and particularly preferably from 1 mol to 200 mol, based on 1 mol of titanium atoms in the solid catalyst component used in step (i).

The amount of olefin to be prepolymerized is usually from 0.01 g to 1000 g, preferably from 0.05 g to 500 g, and particularly preferably from 0.1 g to 200 g, based on 1 g of the solid catalyst component for olefin polymerization used in step (i).

The slurry concentration of solid catalyst component for olefin polymerization during slurry polymerization in step (i) is preferably 1 to 500 g of solid catalyst component for olefin polymerization/L of solvent, and particularly preferably 3 to 300 g of solid catalyst component for olefin polymerization/L of solvent.

The temperature of the prepolymerization is preferably from −20° C. to 100° C., and particularly preferably from 0° C. to 80° C. The partial pressure of olefin in the gas phase during the prepolymerization is preferably from 0.01 MPa to 2 MPa, and particularly preferably from 0.1 MPa to 1 MPa, but this is not the case for an olefin that is liquid at the pressure or temperature of the prepolymerization. The prepolymerization time is preferably 2 minutes to 15 hours.

Examples of a method of supplying an solid catalyst component for olefin polymerization, an organoaluminum compound, and an olefin to a polymerization reactor during prepolymerization include the following methods (1) and (2):

method (1) of supplying an olefin after supplying an solid catalyst component for olefin polymerization and an organoaluminum compound; and method (2) of supplying an organoaluminum compound after supplying an solid catalyst component for olefin polymerization and an olefin.

Examples of a method of supplying an olefin to a polymerization reactor during prepolymerization include the following methods (1) and (2):

method (1) of sequentially supplying an olefin to a polymerization reactor so as to maintain a pressure in the polymerization reactor at a predetermined pressure; and method (2) of supplying, as one portion, the whole volume of predetermined amount of olefin to a polymerization reactor.

The amount of external electron donor used during prepolymerization is usually from 0.01 mol to 400 mol, preferably from 0.02 mol to 200 mol, and particularly preferably from 0.03 mol to 100 mol, based on 1 mol of titanium atoms contained in the solid catalyst component for olefin polymerization, and is usually from 0.003 mol to 50 mol, preferably from 0.005 mol to 30 mol, and particularly preferably from 0.01 mol to 10 mol, based on 1 mol of the organoaluminum compound.

Examples of a method of supplying an external electron donor to a polymerization reactor during prepolymerization include the following methods (1) and (2):
  method (1) of supplying an external electron donor alone to a polymerization reactor; and
  method (2) of supplying a contact material containing an external electron donor and an organoaluminum compound to a polymerization reactor.

The amount of organoaluminum compound used in the main polymerization is usually from 1 mol to 1000 mol, and particularly preferably from 5 mol to 600 mol, based on 1 mol of titanium atoms in the solid catalyst component for olefin polymerization.

When an external electron donor is used in the main polymerization, the amount of external electron donor used is usually from 0.1 mol to 2000 mol, preferably from 0.3 mol to 1000 mol, and particularly preferably from 0.5 mol to 800 mol, based on 1 mol of titanium atoms contained in the solid catalyst component for olefin polymerization, and is usually from 0.001 mol to 5 mol, preferably from 0.005 mol to 3 mol, and particularly preferably from 0.01 mol to 1 mol, based on 1 mol of the organoaluminum compound.

The temperature of the main polymerization is usually from −30° C. to 300° C., and preferably from 20° C. to 180° C. The polymerization pressure is not particularly limited, and is generally from atmospheric pressure to 10 MPa and preferably from about 200 kPa to 5 MPa from the viewpoint of industrial and economic efficiency. The polymerization is batch-type or continuous polymerization, and examples of the polymerization process include a slurry polymerization process or a solution polymerization process using, as a solvent, inert hydrocarbon (e.g., propane, butane, isobutane, pentane, hexane, heptane, octane), a bulk polymerization process using, as a medium, an olefin that is liquid at the polymerization temperature, or a gas phase polymerization process.

In order to adjust the molecular weight of polymer produced by the main polymerization, a chain transfer agent (e.g., hydrogen, alkyl zinc (e.g., dimethyl zinc, diethyl zinc)) may be used.

<How to Produce Heterophasic Propylene Polymerization Material>

In the method for producing a heterophasic propylene polymerization material according to the present invention, propylene, for example, is polymerized in the presence of the olefin polymerization catalyst.

An example of the method for producing a heterophasic propylene polymerization material will be described. This production method includes step 1 and step 2.

Step 1: at least one step selected from the group consisting of step 1-a of polymerizing a propylene-containing monomer in a liquid phase under a condition where a hydrogen/propylene ratio is appropriate to obtain at least part of a propylene-based polymer (a) and step 1-b of polymerizing a propylene-containing monomer in a gas phase under a condition where a hydrogen/propylene ratio is appropriate to obtain at least part of a propylene-based polymer (a); and
  step 2: a step of polymerizing a monomer containing propylene and at least one α-olefin selected from the group consisting of ethylene and $C_{4-12}$ α-olefins under a condition where a hydrogen/propylene ratio is appropriate to obtain a propylene-based copolymer (b).

Provided that as used herein, the hydrogen/propylene ratio is defined as follows.

In the case of polymerization in the liquid phase, the hydrogen/propylene ratio refers to the ratio of the substance amount of hydrogen as a gas to the substance amount of propylene as a liquid in the reactor supply unit.

In the case of polymerization in the gas phase, the hydrogen/propylene ratio refers to the ratio of the substance amount of hydrogen as a gas to the substance amount of propylene as a gas at the reactor outlet.

As used herein, for example, the phrase "the hydrogen/propylene ratio is 1 mol ppm" has the same meaning as "the hydrogen/propylene ratio is $1 \times 10^{-6}$ mol/mol", and means that $1 \times 10^{-6}$ mol of hydrogen is present per mol of propylene.

The hydrogen/propylene ratio is usually from 0.00001 to 10 mol/mol, preferably from 0.0001 to 1 mol/mol, and more preferably from 0.001 to 0.5 mol/mol.

[Step 1-a]

In step 1-a, for example, a liquid phase polymerization reactor may be used to polymerize a propylene-containing monomer in the presence of a polymerization catalyst and hydrogen. The configuration of the monomer used for polymerization may be adjusted, if appropriate, based on the kind and content of the monomer unit constituting the propylene-based polymer (a). The content of propylene in the monomer may be, for example, 80 mass % or more, 90 mass % or more, or 100 mass % based on the total mass of the monomer.

Examples of the liquid-phase polymerization reactor include a loop-type liquid phase reactor or a vessel-type liquid phase reactor.

Examples of the polymerization catalyst include a Ziegler-Natta catalyst or a metallocene catalyst, and a Ziegler-Natta catalyst is preferable. The Ziegler-Natta type catalyst is, for example, a catalyst containing the above-described solid catalyst component for olefin polymerization, an organoaluminum compound, and an electron donating compound. A catalyst pre-activated by bringing a small amount of olefin into contact may also be used as a polymerization catalyst.

The polymerization catalyst used may be a prepolymerization catalyst component obtained by prepolymerizing an olefin in the presence of, for example, the above-described solid catalyst component for olefin polymerization, n-hexane, triethylaluminum, and/or bis(ethylamino)dicyclopentylsilane. The olefin used in the prepolymerization is preferably any of the olefins constituting the heterophasic propylene polymerization material.

The polymerization temperature may be, for example, from 0 to 120° C. The polymerization pressure may be, for example, from atmospheric pressure to 10 MPaG.

Step 1-a may be carried out continuously at multiple stages in series while using multiple reactors.

[Step 1-b]

In step 1-b, for example, a gas-phase polymerization reactor may be used to polymerize a propylene-containing monomer in the presence of a polymerization catalyst and hydrogen. The configuration of the monomer used for polymerization may be adjusted, if appropriate, based on the kind and content of the monomer unit constituting the propylene-based polymer (a). The content of propylene in the monomer may be, for example, 80 mass % or more, 90 mass % or more, or 100 mass % based on the total mass of the monomer.

Examples of the gas-phase polymerization reactor include a fluidized-bed-type reactor or a spouted-bed-type reactor.

The gas-phase polymerization reactor may be a multistage gas-phase polymerization reactor having a plurality of reaction zones connected in series. The multistage gas-phase polymerization reactor may be a multistage gas-phase polymerization reactor having a plurality of polymerization tanks connected in series. According to such an apparatus, it is considered to be easy to adjust the intrinsic viscosity of the propylene-based polymer (a) to the above range.

The multistage gas-phase polymerization reactor may include, for example, a cylindrical section extending in a vertical direction and a tapered section formed and tapered downward in the cylindrical section and having a gas introduction opening at a lower end, and may be provided with: a spouted-bed-type olefin polymerization reaction zone having a spouted layer formed inside and surrounded by an inner surface of the tapered section and an inner surface of the cylindrical section disposed above the tapered section; and a fluidized-bed-type olefin polymerization reaction zone.

The multistage gas-phase polymerization reactor preferably has a plurality of reaction zones in the vertical direction. The multistage gas-phase polymerization reactor has, for example, a plurality of reaction zones in the vertical direction from the viewpoint of the intrinsic viscosity of the propylene-based polymer (a). Preferably, the uppermost stage is a fluidized-bed-type olefin polymerization reaction zone, and the rest are a plurality of spouted-bed-type olefin polymerization reaction zones. In such an apparatus, for example, a solid component is supplied from an upper part of the apparatus, and a gas component is supplied from a lower part of the apparatus, thereby forming a fluidized bed or a spouted bed in the corresponding reaction zone. The gas component may contain an inert gas (e.g., nitrogen) in addition to the propylene-containing monomer and hydrogen. In the apparatus, the number of spouted-bed-type olefin polymerization reaction zones is preferably 3 or more.

When the plurality of reaction zones are disposed in the vertical direction, the reaction zone(s) in the lower stage may be arranged obliquely downward of the reaction zone(s) in the upper stage. In such an apparatus, for example, the solid component obtained in an upper reaction zone is discharged in the obliquely downward direction, and the discharged solid component is supplied to a lower reaction zone from the obliquely upward direction. In this case, for example, the gas component discharged from the upper part of the lower reaction zone is supplied from the lower part of the upper reaction zone.

Specific examples of the polymerization catalyst are as described above.

The polymerization temperature may be, for example, from 0 to 120° C., from 20 to 100° C., or from 40 to 100° C. The polymerization pressure may be, for example, from atmospheric pressure to 10 MPaG or from 1 to 5 MPaG.

[Step 2]

Step 2 may be performed in a liquid phase or a gas phase, but is performed in a gas phase, for example. In the case of a liquid phase, for example, a liquid phase reactor (e.g., a loop-type or vessel-type reactor) may be used. In the case of a gas phase, for example, a gas phase reactor (e.g., a fluidized-bed-type reactor, a spouted-bed-type reactor) may be used.

Step 2 includes polymerizing a monomer containing propylene and at least one α-olefin selected from the group consisting of ethylene and $C_{4-12}$ α-olefins in the presence of a polymerization catalyst and hydrogen. The configuration of the monomer used for polymerization may be adjusted, if appropriate, based on the kind and content of the monomer unit constituting the propylene-based copolymer (b). The content of at least one α-olefin selected from the group consisting of ethylene and $C_{4-12}$ α-olefins in the monomer used for polymerization may be, for example, from 30 to 55 mass % or from 35 to 50 mass % based on the total mass of the monomer.

Specific examples of the polymerization catalyst are as described above.

In the case of polymerization in a liquid phase, the polymerization temperature is, for example, from 40 to 100° C., and the polymerization pressure is, for example, from atmospheric pressure to 5 MPaG. In the case of polymerization in a gas phase, the polymerization temperature is, for example, from 40 to 100° C., and the polymerization pressure is, for example, from 0.5 to 5 MPaG.

The propylene-based polymer (a) and the propylene-based copolymer (b) may be prepared in the respective steps, the polymerization catalyst may be deactivated, and the propylene-based polymer (a) and the propylene-based copolymer (b) may then be mixed in a solution state, a molten state, or the like. However, a polymer may be continuously prepared by supplying the resulting polymer to the next step without deactivating the catalyst. When polymerization is continuously performed without deactivating the catalyst, the polymerization catalyst in the previous step also acts as a polymerization catalyst in the subsequent step.

The order of step 1 and step 2 is not particularly limited. Step 1 preferably comprises steps 1-a and 1-b.

The production method according to this embodiment may include, in sequence, step 1-a, step 1-b, and step 2.

EXAMPLES

Hereinafter, the present invention will be described more specifically with reference to Examples and Comparative Examples. However, the invention is not limited to the Examples below.

Table 1 lists each silicon compound (external donor) to be brought into contact with the solid catalyst component for olefin polymerization and the structure thereof.

TABLE 1

| External donor (Silicon compound) | Structure |
|---|---|
| Bis(ethylamino)dicyclopentylsilane (Silicon compound P) | (two cyclopentyl groups attached to Si, with EtHN and NHEt) |
| Cyclohexyltriethoxysilane (Silicon compound Q) | (cyclohexyl-Si(OEt)₃) |
| Triethoxyphenylsilane (Silicon compound R) | (phenyl-Si(OEt)₃) |

TABLE 1-continued

| External donor (Silicon compound) | Structure |
|---|---|
| Cyclohexylethyldimethoxysilane (Silicon compound S) | Cyclohexyl-Si(Et)(OMe)(OMe) |
| tert-Butyl-n-propyl-dimethoxysilane (Silicon compound T) | $^t$Bu-Si($^n$Pr)(OMe)(OMe) |
| Dicyclopentyldimethoxysilane (Silicon compound U) | (Cyclopentyl)$_2$Si(OMe)(OMe) |

<To Measure Cold Xylene Soluble Component Amount CXS (Unit: Mass %)>

A sample (olefin polymer or heterophasic propylene polymerization material) was dissolved in boiling xylene, and the resulting xylene solution was then cooled to precipitate a cold xylene insoluble component. The obtained mixture was filtered, and the olefin polymer or the heterophasic propylene polymerization material (cold xylene soluble component) dissolved in the resulting filtrate was quantified by liquid chromatography (LC).

(Pretreatment Conditions)
   Sample amount: 1 g of olefin polymer or 0.1 g of heterophasic propylene polymerization material
   Solvent: 100 mL of xylene containing dibutylhydroxytoluene (BHT) at a concentration of 2 mg/100 mL (special grade, manufactured by FUJIFILM Wako Pure Chemical Corporation)
   Dissolution conditions: reflux for 30 minutes after boiling
   Temperature conditions: cooled with ice water for 20 minutes, and then stirred for 1 hour after the temperature was raised to 20° C.
   Filtration conditions: filtered with filter paper (No. 50) and then measured by LC.

(LC Measurement Conditions)
   Liquid feeding pump: LC-20 AD (manufactured by Shimadzu Corporation)
   Degasser: DGU-20A3 (manufactured by Shimadzu Corporation)
   Autosampler: SIL-20A HT (manufactured by Shimadzu Corporation)
   Column oven: CTO-20A (manufactured by Shimadzu Corporation)
   Differential refractive index detector: RID-10A (manufactured by Shimadzu Corporation)
   System controller: CBM-20A (manufactured by Shimadzu Corporation)
   Measurement and analysis software: LC solution ver. 1.24 SP1
   Column: SHODEX GPC KF-801 ((upper limit) exclusion limit molecular weight: 1500)
   Eluent: tetrahydrofuran (special grade, stabilizer free, manufactured by KANTO CHEMICAL CO., INC.)
   Column oven temperature: 40° C.
   Sample injection volume: 130 μL
   Flow rate: 1 mL/min
   Detector: differential refractometer <To Measure the Percentage of Component Contained in a Cold Xylene Soluble Component of Olefin Polymer and Having a Molecular Weight of 103.5 or Less in Terms of Polystyrene, or to Measure the Percentage of Component Contained in a Cold Xylene Soluble Component of Heterophasic Propylene Polymerization Material and Having a Molecular Weight of $10^{4.0}$ or Less in Terms of Polystyrene (Unit: %)>

Gel permeation chromatography (GPC) was used under the conditions below to determine the percentage (%) of a component having a molecular weight of $10^{3.5}$ or less in terms of polystyrene and contained in a cold xylene soluble component of the olefin polymer based on all components of the cold xylene soluble component of the olefin polymer and the percentage (%) of a component having a molecular weight of $10^{4.0}$ or less in terms of polystyrene and contained in a cold xylene soluble component of the heterophasic propylene polymerization material based on all components of the cold xylene soluble component of the heterophasic propylene polymerization material.

(Measurement Sample)

In the measurement of the CXS described above, the filtrate (i.e., a xylene solution in which the olefin polymer or the heterophasic propylene polymerization material (cold xylene soluble component) had been dissolved) was used as a measurement sample.

(GPC Measurement Conditions)
   Liquid feeding pump: LC-20 AD (manufactured by Shimadzu Corporation)
   Degasser: DGU-20A3 (manufactured by Shimadzu Corporation)
   Autosampler: SIL-20A HT (manufactured by Shimadzu Corporation)
   Column oven: CTO-20A (manufactured by Shimadzu Corporation)
   Differential refractive index detector: RID-10A (manufactured by Shimadzu Corporation)
   System controller: CBM-20A (manufactured by Shimadzu Corporation)
   Measurement and analysis software: LC solution ver. 1.24 SP1 (manufactured by Shimadzu Corporation)
   GPC column: Plus Pore series Poly Pore 7.5 mm I.D.×300 mm (Agilent Technologies) 2 columns
   Mobile phase: Tetrahydrofuran (special grade without any stabilizer, manufactured by KANTO CHEMICAL CO., INC.)
   Flow rate: 1 mL/min
   Column oven temperature: 35° C.
   Detection: differential refractive index detector
   Differential refractive index detector cell temperature: 35° C.
   Sample solution injection volume: 300 μL of olefin polymer or 100 μL of heterophasic propylene polymerization material
   Standard substance for GPC column calibration: PStQuick Kit-H (manufactured by Tosoh Corporation)

(Analysis Method)

First, 1 mL of tetrahydrofuran (special grade, stabilizer free, manufactured by KANTO CHEMICAL CO., INC.) was added to each vial of standard polystyrene kit PStQuick Kit-H (PStQuickA: a polystyrene mixture having weight-average molecular weights of 1090000, 190000, 18100, and 2420; PStQuickB: a polystyrene mixture with weight-average molecular weights of 706000, 96400, 10200 and 1010; PStQuickC: a polystyrene mixture with weight-average molecular weights of 427000, 37900, 5970 and 500) manufactured by Tosoh Corporation, and each mixture was dissolved to prepare a sample for drawing a calibration curve. In the chromatogram for measuring each calibration curve-drawing sample by GPC, the calibration curve was drawn by analysis software for LC (LC solution, manufactured by Shimadzu Corporation) while using the elution time and the molecular weight of the peak top. The calibration curve was a third-order approximate expression. The calibration curve was used to calculate the elution time of the component having a molecular weight of $10^{3.5}$ or $10^{4.0}$ in terms of polystyrene.

In the chromatogram of the GPC measurement, the peak area of all the cold xylene soluble components was calculated while the whole one peak was defined from the start of the peak of the cold xylene soluble component to immediately before the start of the peak of BHT. The percentage of the peak area was calculated by the following method (i) or method (ii):

(i) The chromatogram vertically divided by the elution time of the component having a molecular weight of $10^{3.5}$ in terms of polystyrene (i.e., from the chromatogram between the vertical divided time point and immediately before the start of the peak of BHT) was used to calculate the peak area of the component having a molecular weight of $10^{3.5}$ or less in terms of polystyrene. The percentage of the peak area of the component having a molecular weight of $10^{3.5}$ or less in terms of polystyrene to the peak area (100%) of all the cold xylene soluble components was then calculated.

(ii) The chromatogram vertically divided by the elution time of the component having a molecular weight of $10^{4.0}$ in terms of polystyrene (i.e., from the chromatogram between the vertical divided time point and immediately before the start of the peak of BHT) was used to calculate the peak area of the component having a molecular weight of $10^{4.0}$ or less in terms of polystyrene. The percentage of the peak area of the component having a molecular weight of $10^{4.0}$ or less in terms of polystyrene to the peak area (100%) of all the cold xylene soluble components was then calculated.

<Content of Ethylene Monomer Unit in Propylene-Based Copolymer (Unit: Mass %)>

In accordance with IR spectrum measurement described on page 619 of Polymer Analysis Handbook (1995, published by KINOKUNIYA COMPANY LTD.), the content of ethylene monomer unit in the heterophasic propylene polymerization material as obtained by an IR spectrum method was determined. The content of ethylene monomer unit in the heterophasic propylene polymerization material was divided by the content of the propylene-based copolymer in the heterophasic propylene polymerization material to determine the content of ethylene monomer unit in the propylene-based copolymer. Note that the ethylene-propylene copolymer content (Z2) in the heterophasic propylene polymerization material was determined by a method described later.

<Measurement of Intrinsic Viscosity [η] (Unit: dL/g)>

A tetralin solution (3 types of concentration: 0.1 g/dL, 0.2 g/dL, and 0.5 g/dL) containing an olefin polymer, a propylene-based polymer, or a heterophasic propylene polymerization material was prepared. Thereafter, the reduced viscosity of the tetralin solution was measured at 135° C. using an Ubbelohde-type viscometer. Each intrinsic viscosity was then determined by the calculation method described in page 491 of "Polymer Solution, Polymer Experimentation 11" (published by KYORITSU SHUPPAN CO., LTD., 1982), that is, the extrapolation method in which the reduced viscosity is plotted with respect to the concentration and the concentration is extrapolated to 0.

<Measurement of Melting Point (Tm) (Unit: ° C.)>

The Tm of olefin polymer was measured using a differential scanning calorimeter (DSC). A sample of olefin polymer (about 5 mg) was filled in an aluminum pan and placed in a differential scanning calorimeter DSC 8500 (manufactured by PerkinElmer, Inc.). The temperature was raised to 230° C., held at 230° C. for 5 minutes, lowered to 0° C. at 5° C./min, held at 0° C. for 5 minutes, and then raised to 200° C. at 5° C./min to measure a melting curve. The temperature was corrected by setting the melting point of indium to 156.6° C. The temperature of the melting peak top in the melting curve was defined as the Tm of the olefin polymer.

<Isotactic Pentad Fraction [mmm]>

The isotactic pentad fraction of propylene-based polymer was measured according to a method using a 13C-NMR spectrum described in Macromolecules, 6, 925 (1973) by A. Zambelli et al. Each absorption peak obtained by 13C-NMR spectrum was assigned based on Macromolecules, 8, 687 (1975). Specifically, the ratio of the area of the mmmm peak to the area of all the absorption peaks of the methyl carbon region as obtained by 13C-NMR spectrum was determined as the isotactic pentad fraction. Note that the isotactic pentad fraction of the NPL standard CRM No. M 19-14 Polypropylene PP/MWD/2 of National PHYSICAL LABORATORY in the UK as determined by this method was 0.944. 13C-NMR measurement was performed under the following conditions.

(Measurement Conditions)
Model: Bruker AVANCE 600
Probe: 10 mm cryoprobe
Measurement temperature: 135° C.
Pulse repeating time: 4 seconds
Pulse width: 45°
Number of integrations: 256 times
Magnetic field strength: 600 MHz <To Measure the High-Boiling-Point Component Amount Index of Olefin Polymer (Unit: Mass Ppm)>

Olefin polymer granules were heated at 105° C. for 6 hours to remove a low-boiling-point component. The resulting olefin polymer granules were measured using simultaneous thermogravimetry-differential thermal analysis (TG-TDA-6200, manufactured by Seiko Instruments Inc). The measurement was performed in a nitrogen atmosphere and started from 30° C. while the temperature raising rate was set to 50° C./min. The temperature was raised to 125° C., and then maintained at 125° C. After that, the high-boiling-point component amount index (mass ppm) of the olefin polymer was calculated according to the following formula:

(Mass (g) after 3 minutes from the start of measurement–Mass (g) after 60 minutes from the start of measurement)/(Mass (g) after 3 minutes from the start of measurement)×1000000.

<To Measure the High-Boiling-Point Component Amount Index of Heterophasic Propylene Polymerization Material (Unit: Mass Ppm)>

The heterophasic propylene polymerization material, the propylene resin composition pellet, or the molding obtained was measured by simultaneous thermogravimetry-differential thermal analysis (TG-TDA-6200, manufactured by Seiko Instruments Inc). The measurement was performed in a nitrogen atmosphere and started from 30° C. while the temperature raising rate was set to 50° C./min. The temperature was raised to 125° C., and then maintained at 125° C. After that, the formula below was used to calculate the high-boiling-point component amount index (mass ppm) of the heterophasic propylene polymerization material, the propylene resin composition pellet, or the molding.

(Mass (g) after 3 minutes from the start of measurement−Mass (g) after 60 minutes from the start of measurement)/(Mass (g) after 3 minutes from the start of measurement)×1000000.

Example 1

(1) To Synthesize Solid Catalyst Component for Olefin Polymerization A

The gas in a 200-L SUS reactor with a stirrer was replaced with nitrogen gas, and toluene (52.8 L) and titanium tetrachloride (33.3 L) were then added and stirred to prepare a titanium tetrachloride-containing toluene solution. The temperature of the titanium tetrachloride-containing toluene solution obtained was adjusted to 0° C. or lower, and magnesium diethoxide (11 kg) was then added thereto in 6 portions every 72 minutes while stirring. The resulting mixture was kept at a temperature not exceeding 2° C. for 150 minutes. Ethyl 2-ethoxymethyl-3,3-dimethylbutanoate (0.76 kg) was added to the resulting mixture, the temperature was raised to 10° C., and the mixture was then kept for 120 minutes. Toluene (14.3 L) was added to the resulting mixture, the temperature was raised to 60° C., and ethyl 2-ethoxymethyl-3,3-dimethylbutanoate (4.0 kg) was then added thereto at the same temperature. The mixture obtained was heated to 110° C. and stirred at the same temperature for 180 minutes. The resulting mixture was subjected to solid-liquid separation at 110° C., and the resulting solid was then washed 3 times with toluene (83 L) at 95° C. Toluene (44 L) was added to the resulting mixture, and titanium tetrachloride (22 L) and ethyl 2-ethoxymethyl-3,3-dimethylbutanoate (0.95 kg) were then added thereto at 60° C. The temperature of the obtained mixture was raised to 110° C., and then stirred at the same temperature for 30 minutes. The resulting mixture was subjected to solid-liquid separation at 110° C., and the resulting solid was then washed 3 times with toluene (83 L) at 60° C. The mixture obtained was washed with hexane (83 L) 3 times and then dried to produce an solid catalyst component for olefin polymerization A (10.2 kg).

(2) To Synthesize Olefin Polymer (1)

An autoclave with a stirrer and an internal volume of 3 L was sufficiently dried, and the inside thereof was then evacuated. To the autoclave were added triethylaluminum (organoaluminum compound) (2.63 mmol), bis(ethylamino) dicyclopentylsilane (silicon compound P) (0.26 mmol), and the solid catalyst component for olefin polymerization A (5.84 mg), followed by propylene (780 g) and hydrogen (0.2 MPa). The temperature of the autoclave was raised to 80° C., and propylene was then polymerized at the same temperature for 1 hour. Thereafter, the unreacted monomer was purged to obtain an olefin polymer (1). The amount (polymerization activity) of the polymer produced per catalyst unit amount was 69 kg (olefin polymer (1))/g (solid catalyst component for olefin polymerization A). The CXS of the olefin polymer (1) was 1.52 mass %, [η] was 0.90 dL/g, Tm was 161.1° C., and the high-boiling-point component amount index was 204 mass ppm. In the olefin polymer (1), the percentage of the component having a molecular weight of $10^{3.5}$ or less in terms of polystyrene to the whole as measured by gel permeation chromatography was 38.95%. The results are shown in Table 2.

<Example 2> To Synthesize Olefin Polymer (2)

An autoclave with a stirrer and an internal volume of 3 L was sufficiently dried, and the inside thereof was then evacuated. To the autoclave were added triethylaluminum (organoaluminum compound) (2.63 mmol), bis(ethylamino) dicyclopentylsilane (silicon compound P) (0.26 mmol), and the solid catalyst component for olefin polymerization A (6.29 mg), followed by propylene (780 g) and hydrogen (0.08 MPa). The temperature of the autoclave was raised to 80° C., and propylene was then polymerized at the same temperature for 1 hour. Thereafter, the unreacted monomer was purged to obtain an olefin polymer (2). The amount (polymerization activity) of the polymer produced per catalyst unit amount was 45 kg (olefin polymer (2))/g (solid catalyst component for olefin polymerization A). The CXS of the olefin polymer (2) was 1.27 mass %, [η] was 1.32 dL/g, Tm was 161.3° C., and the high-boiling-point component amount index was 246 mass ppm. In the olefin polymer (2), the percentage of the component having a molecular weight of $10^{3.5}$ or less in terms of polystyrene to the whole as measured by gel permeation chromatography was 18.28%. The results are shown in Table 2.

<Example 3> To Synthesize Olefin Polymer (3)

An autoclave with a stirrer and an internal volume of 3 L was sufficiently dried, and the inside thereof was then evacuated. To the autoclave were added triethylaluminum (organoaluminum compound) (2.63 mmol), bis(ethylamino) dicyclopentylsilane (silicon compound P) (0.26 mmol), and the solid catalyst component for olefin polymerization A (8.23 mg), followed by propylene (780 g) and hydrogen (0.01 MPa). The temperature of the autoclave was raised to 80° C., and propylene was then polymerized at the same temperature for 1 hour. Thereafter, the unreacted monomer was purged to obtain an olefin polymer (3). The amount (polymerization activity) of the polymer produced per catalyst unit amount was 19 kg (olefin polymer (3))/g (solid catalyst component for olefin polymerization A). The CXS of the olefin polymer (3) was 3.00 mass %, [η] was 2.64 dL/g, Tm was 160.5° C., and the high-boiling-point component amount index was 434 mass ppm. In the olefin polymer (3), the percentage of the component having a molecular weight of $10^{3.5}$ or less in terms of polystyrene to the whole as measured by gel permeation chromatography was 3.16%. The results are shown in Table 2.

<Example 4> To Synthesize Olefin Polymer (4)

An autoclave with a stirrer and an internal volume of 3 L was sufficiently dried, and the inside thereof was then evacuated. To the autoclave were added triethylaluminum (organoaluminum compound) (2.63 mmol), cyclohexyltriethoxysilane (silicon compound Q) (0.26 mmol), and the solid catalyst component for olefin polymerization A (7.20 mg), followed by propylene (780 g) and hydrogen (0.11 MPa). The temperature of the autoclave was raised to 80° C., and propylene was then polymerized at the same temperature for 1 hour. Thereafter, the unreacted monomer was purged to obtain a propylene polymer (4) alone. The amount (polymerization activity) of the polymer produced per catalyst unit amount was 42 kg (olefin polymer (4))/g (solid catalyst component for olefin polymerization A). The CXS of the olefin polymer (4) was 1.19 mass %, [η] was 1.19 dL/g, Tm was 161.6° C., and the high-boiling-point component amount index was 273 mass ppm. In the olefin polymer (4), the percentage of the component having a molecular weight of $10^{3.5}$ or less in terms of polystyrene to the whole as measured by gel permeation chromatography was 20.11%. The results are shown in Table 2.

Example 5

(1) To Synthesize Solid Catalyst Component for Olefin Polymerization B

The gas in a 200-L SUS reactor with a stirrer was replaced with nitrogen gas, and toluene (60.1 L) and titanium tetrachloride (22.3 L) were then added and stirred to prepare a titanium tetrachloride-containing toluene solution. The temperature of the titanium tetrachloride-containing toluene solution obtained was adjusted to 0° C. or lower, and magnesium diethoxide (11 kg) was then added thereto in 6 portions every 72 minutes while stirring. The resulting mixture was kept at a temperature not exceeding 2° C. for 90 minutes. The mixture obtained was heated to 10° C. and kept for 90 minutes. Toluene (14.3 L) was added to the resulting mixture, the temperature was raised to 60° C., and ethyl 2-ethoxymethyl-3,3-dimethylbutanoate (4.0 kg) was then added thereto at the same temperature. The mixture obtained was heated to 110° C. and stirred at the same temperature for 180 minutes. The resulting mixture was subjected to solid-liquid separation at 110° C., and the resulting solid was then washed 3 times with toluene (83 L) at 95° C. Toluene (43 L) was added to the resulting mixture, and titanium tetrachloride (22 L) was then added thereto at 60° C. The mixture obtained was heated to 105° C. and stirred at the same temperature for 60 minutes. The resulting mixture was subjected to solid-liquid separation at 105° C., and the resulting solid was then washed 3 times with toluene (83 L) at 60° C. The mixture obtained was washed with hexane (83 L) 3 times and then dried to produce an solid catalyst component for olefin polymerization B (8.4 kg).

(2) To Synthesize Olefin Polymer (5)

An autoclave with a stirrer and an internal volume of 3 L was sufficiently dried, and the inside thereof was then evacuated. To the autoclave were added triethylaluminum (organoaluminum compound) (2.63 mmol), bis(ethylamino)dicyclopentylsilane (silicon compound P) (0.26 mmol), and the solid catalyst component for olefin polymerization B (8.96 mg), followed by propylene (780 g) and hydrogen (0.08 MPa). The temperature of the autoclave was raised to 80° C., and propylene was then polymerized at the same temperature for 1 hour. Thereafter, the unreacted monomer was purged to obtain an olefin polymer (5). The amount (polymerization activity) of the polymer produced per catalyst unit amount was 53 kg (olefin polymer (5))/g (solid catalyst component for olefin polymerization B). The CXS of the olefin polymer (5) was 2.06 mass %, [η] was 1.18 dL/g, Tm was 161.0° C., and the high-boiling-point component amount index was 303 mass ppm. In the olefin polymer (5), the percentage of the component having a molecular weight of $10^{3.5}$ or less in terms of polystyrene to the whole as measured by gel permeation chromatography was 17.92%. The results are shown in Table 2.

<Example 6> To Synthesize Olefin Polymer (6)

An autoclave with a stirrer and an internal volume of 3 L was sufficiently dried, and the inside thereof was then evacuated. To the autoclave were added triethylaluminum (organoaluminum compound) (2.63 mmol), triethoxyphenylsilane (silicon compound R) (0.26 mmol), and the solid catalyst component for olefin polymerization B (8.14 mg), followed by propylene (780 g) and hydrogen (0.08 MPa). The temperature of the autoclave was raised to 80° C., and propylene was then polymerized at the same temperature for 1 hour. Thereafter, the unreacted monomer was purged to obtain an olefin polymer (6). The amount (polymerization activity) of the polymer produced per catalyst unit amount was 43 kg (olefin polymer (6))/g (solid catalyst component for olefin polymerization B). The CXS of the olefin polymer (6) alone was 1.17 mass %, [η] was 1.32 dL/g, Tm was 161.9° C., and the high-boiling-point component amount index was 478 mass ppm. In the olefin polymer (6), the percentage of the component having a molecular weight of $10^{3.5}$ or less in terms of polystyrene to the whole as measured by gel permeation chromatography was 12.50%. The results are shown in Table 2.

<Comparative Example 1> To Synthesize Olefin Polymer (C1)

An autoclave with a stirrer and an internal volume of 3 L was sufficiently dried, and the inside thereof was then evacuated. To the autoclave were added triethylaluminum (organoaluminum compound) (2.63 mmol), cyclohexylethyldimethoxysilane (silicon compound S) (0.26 mmol), and the solid catalyst component for olefin polymerization A (6.10 mg), followed by propylene (780 g) and hydrogen (0.15 MPa). The temperature of the autoclave was raised to 80° C., and propylene was then polymerized at the same temperature for 1 hour. Thereafter, the unreacted monomer was purged to obtain an olefin polymer (C1). The amount (polymerization activity) of the polymer produced per catalyst unit amount was 51 kg (olefin polymer (C1))/g (solid catalyst component for olefin polymerization A). The CXS of the olefin polymer (C1) was 0.66 mass %, [η] was 1.32 dL/g, Tm was 162.2° C., and the high-boiling-point component amount index was 983 mass ppm. In the olefin polymer (C1), the percentage of the component having a molecular weight of $10^{3.5}$ or less in terms of polystyrene to the whole as measured by gel permeation chromatography was 38.28%. The results are shown in Table 2.

<Comparative Example 2> To Synthesize Olefin Polymer (C2)

An autoclave with a stirrer and an internal volume of 3 L was sufficiently dried, and the inside thereof was then evacuated. To the autoclave were added triethylaluminum (organoaluminum compound) (2.63 mmol), tert-butyl-n-propyl-dimethoxysilane (silicon compound T) (0.26 mmol), and the solid catalyst component for olefin polymerization A (4.73 mg), followed by propylene (780 g) and hydrogen (0.43 MPa). The temperature of the autoclave was raised to 80° C., and propylene was then polymerized at the same temperature for 1 hour. Thereafter, the unreacted monomer was purged to obtain an olefin polymer (C2). The amount (polymerization activity) of the polymer produced per catalyst unit amount was 80 kg (olefin polymer (C2))/g (solid catalyst component for olefin polymerization A). The CXS of the olefin polymer (C2) was 1.04 mass %, [η] was 0.89 dL/g, Tm was 161.6° C., and the high-boiling-point component amount index was 860 mass ppm. In the olefin polymer (C2), the percentage of the component having a molecular weight of $10^{3.5}$ or less in terms of polystyrene to the whole as measured by gel permeation chromatography was 64.08%. The results are shown in Table 2.

<Comparative Example 3> To Synthesize Olefin Polymer (C3)

An autoclave with a stirrer and an internal volume of 3 L was sufficiently dried, and the inside thereof was then evacuated. To the autoclave were added triethylaluminum (organoaluminum compound) (2.63 mmol), tert-butyl-n-propyl-dimethoxysilane (silicon compound T) (0.26 mmol), and the solid catalyst component for olefin polymerization A (4.55 mg), followed by propylene (780 g) and hydrogen (0.30 MPa). The temperature of the autoclave was raised to 80° C., and propylene was then polymerized at the same temperature for 1 hour. Thereafter, the unreacted monomer was purged to obtain an olefin polymer (C3). The amount (polymerization activity) of the polymer produced per catalyst unit amount was 104 kg (olefin polymer (C3))/g (solid catalyst component for olefin polymerization A). The CXS of the olefin polymer (C3) was 0.46 mass %, [η] was 1.27 dL/g, Tm was 162.3° C., and the high-boiling-point component amount index was 821 mass ppm. In the olefin polymer (C3), the percentage of the component having a molecular weight of $10^{3.5}$ or less in terms of polystyrene to the whole as measured by gel permeation chromatography was 56.32%. The results are shown in Table 2.

<Comparative Example 4> To Synthesize Olefin Polymer (C4)

An autoclave with a stirrer and an internal volume of 3 L was sufficiently dried, and the inside thereof was then evacuated. To the autoclave were added triethylaluminum (organoaluminum compound) (2.63 mmol), tert-butyl-n-propyl-dimethoxysilane (silicon compound T) (0.26 mmol), and the solid catalyst component for olefin polymerization B (5.15 mg), followed by propylene (780 g) and hydrogen (0.25 MPa). The temperature of the autoclave was raised to 80° C., and propylene was then polymerized at the same temperature for 1 hour. Thereafter, the unreacted monomer was purged to obtain an olefin polymer (C4). The amount (polymerization activity) of the polymer produced per catalyst unit amount was 79 kg (olefin polymer (C4))/g (solid catalyst component for olefin polymerization B). The CXS of the olefin polymer (C4) was 1.24 mass %, [η] was 1.29 dL/g, Tm was 162.0° C., and the high-boiling-point component amount index was 820 mass ppm. In the olefin polymer (C4), the percentage of the component having a molecular weight of $10^{3.5}$ or less in terms of polystyrene to the whole as measured by gel permeation chromatography was 54.83%. The results are shown in Table 2.

<Comparative Example 5> To Synthesize Olefin Polymer (C5)

An autoclave with a stirrer and an internal volume of 3 L was sufficiently dried, and the inside thereof was then evacuated. To the autoclave were added triethylaluminum (organoaluminum compound) (2.63 mmol), dicyclopentyldimethoxysilane (silicon compound U) (0.26 mmol), and the solid catalyst component for olefin polymerization A (5.14 mg), followed by propylene (780 g) and hydrogen (0.40 MPa). The temperature of the autoclave was raised to 80° C., and propylene was then polymerized at the same temperature for 1 hour. Thereafter, the unreacted monomer was purged to obtain an olefin polymer (C5). The amount (polymerization activity) of the polymer produced per catalyst unit amount was 134 kg (olefin polymer (C5))/g (solid catalyst component for olefin polymerization A). The CXS of the olefin polymer (C5) was 0.60 mass %, [η] was 1.17 dL/g, Tm was 163.2° C., and the high-boiling-point component amount index was 1269 mass ppm. In the olefin polymer (C5), the percentage of the component having a molecular weight of $10^{3.5}$ or less in terms of polystyrene to the whole as measured by gel permeation chromatography was 70.17%. The results are shown in Table 2.

<Comparative Example 6> To Synthesize Olefin Polymer (C6)

An autoclave with a stirrer and an internal volume of 3 L was sufficiently dried, and the inside thereof was then evacuated. To the autoclave were added triethylaluminum (organoaluminum compound) (2.63 mmol), cyclohexylethyldimethoxysilane (silicon compound S) (0.26 mmol), and the solid catalyst component C (6.22 mg) described in Example 1(2) of JP-A-2004-182981, followed by propylene (780 g) and hydrogen (0.27 MPa). The temperature of the autoclave was raised to 80° C., and propylene was then polymerized at the same temperature for 1 hour. Thereafter, the unreacted monomer was purged to obtain an olefin polymer (C6). The amount (polymerization activity) of the polymer produced per catalyst unit amount was 42 kg (olefin polymer (C6))/g (solid catalyst component for olefin polymerization C). The CXS of the olefin polymer (C6) was 0.97 mass %, [η] was 1.16 dL/g, Tm was 161.8° C., and the high-boiling-point component amount index was 1135 mass ppm. In the olefin polymer (C6), the percentage of the component having a molecular weight of $10^{3.5}$ or less in terms of polystyrene to the whole as measured by gel permeation chromatography was 62.87%. The results are shown in Table 2.

<Comparative Example 7> To Synthesize Olefin Polymer (C7)

An autoclave with a stirrer and an internal volume of 3 L was sufficiently dried, and the inside thereof was then evacuated. To the autoclave were added triethylaluminum (organoaluminum compound) (2.63 mmol), tert-butyl-n-propyl-dimethoxysilane (silicon compound T) (0.26 mmol), and the solid catalyst component C (4.73 mg) described in Example 1(2) of JP-A-2004-182981, followed by propylene (780 g) and hydrogen (0.37 MPa). The temperature of the autoclave was raised to 80° C., and propylene was then polymerized at the same temperature for 1 hour. Thereafter, the unreacted monomer was purged to obtain an olefin polymer (C7). The amount (polymerization activity) of the polymer produced per catalyst unit amount was 61 kg (olefin polymer (C7))/g (solid catalyst component for olefin polymerization C). The CXS of the olefin polymer (C7) was 0.75 mass %, [η] was 1.17 dL/g, Tm was 162.7° C., and the high-boiling-point component amount index was 889 mass ppm. In the olefin polymer (C7), the percentage of the component having a molecular weight of $10^{3.5}$ or less in terms of polystyrene to the whole as measured by gel permeation chromatography was 72.55%. The results are shown in Table 2.

TABLE 2

| | Solid catalyst component for olefin polymerization | Silicon compound | X1 (mass %) | Y1 (%) | Y1/X1 (—) | Tm (° C.) | High-boiling-point component amount index (mass ppm) |
|---|---|---|---|---|---|---|---|
| Example 1 | A | P | 1.52 | 38.95 | 25.63 | 161.1 | 204 |
| Example 2 | A | P | 1.27 | 18.28 | 14.39 | 161.3 | 246 |
| Example 3 | A | P | 3.00 | 3.16 | 1.05 | 160.5 | 434 |
| Example 4 | A | Q | 1.19 | 20.11 | 16.90 | 161.6 | 273 |
| Example 5 | B | P | 2.06 | 17.92 | 8.70 | 161.0 | 303 |
| Example 6 | B | R | 1.17 | 12.50 | 10.68 | 161.9 | 478 |
| Comparative Example 1 | A | S | 0.66 | 38.28 | 57.99 | 162.2 | 983 |
| Comparative Example 2 | A | T | 1.04 | 64.08 | 61.62 | 161.6 | 860 |
| Comparative Example 3 | A | T | 0.46 | 56.32 | 122.44 | 162.3 | 821 |
| Comparative Example 4 | B | T | 1.24 | 54.83 | 44.22 | 162.0 | 820 |
| Comparative Example 5 | A | U | 0.60 | 70.17 | 116.95 | 163.2 | 1269 |
| Comparative Example 6 | C | S | 0.97 | 62.87 | 64.82 | 161.8 | 1135 |
| Comparative Example 7 | C | T | 0.75 | 72.55 | 96.73 | 162.7 | 889 |

X1: Cold xylene soluble component amount (CXS) of olefin polymer
Y1: Percentage of a component having a molecular weight of $10^{3.5}$ or less in terms of polystyrene and contained in a cold xylene soluble component of the olefin polymer based on all components of the cold xylene soluble component of the olefin polymer as measured by gel permeation chromatography As can be understood from the results described in Table 2, the olefin polymer of any of Examples 1 to 6 has a smaller high-boiling-point component amount index than that of any of Comparative Examples 1 to 7, and therefore has a lower resin odor. The olefin polymer of any of Examples 1 to 6 has a small high-boiling-point component amount index, but has a melting point that is not high and is maintained. The melting point is rather lower than that of any of Comparative Examples 1 to 7, so that low-temperature heat sealing performance, for example, is maintained. Note that Comparative Example 1 corresponds to a replication of Examples of a known literature (WO-A-2018/025862).

Example 11

(1) To Synthesize Solid Catalyst Component for Olefin Polymerization D

The gas in a 200-L SUS reactor with a stirrer was replaced with nitrogen gas, and toluene (52.8 L) was then added and stirred. Next, magnesium diethoxide (11 kg) was added thereto to prepare a slurry. The temperature of the obtained slurry was adjusted to 0° C. or lower, and titanium tetrachloride (33.3 L) was then added in three portions while stirring. The resulting mixture was kept at a temperature not exceeding 2° C. for 150 minutes. Ethyl 2-ethoxymethyl-3,3-dimethylbutanoate (0.76 kg) was added to the resulting mixture, the temperature was raised to 10° C., and the mixture was then kept for 120 minutes. Toluene (14.3 L) was added to the resulting mixture, the temperature was raised to 60° C., and ethyl 2-ethoxymethyl-3,3-dimethylbutanoate (4.0 kg) was then added thereto at the same temperature. The mixture obtained was then heated to 110° C. and stirred at the same temperature for 180 minutes. The resulting mixture was subjected to solid-liquid separation at 110° C., and the resulting solid was then washed 3 times with toluene (83 L) at 95° C. Toluene (33 L) was added to the resulting mixture, and titanium tetrachloride (33 L) and ethyl 2-ethoxymethyl-3,3-dimethylbutanoate (0.95 g) were then added thereto at 60° C. The mixture obtained was heated to 110° C. and stirred at the same temperature for 30 minutes. The resulting mixture was subjected to solid-liquid separation at 110° C., and the resulting solid was then washed 3 times with toluene (83 L) at 95° C. The mixture obtained was washed with hexane (83 L) 3 times and then dried to produce an solid catalyst component for olefin polymerization D (10.6 kg).

(2) To Synthesize Heterophasic Propylene Polymerization Material (11)

[Prepolymerization]

To a stainless steel (SUS) autoclave having an internal volume of 2 L and equipped with a stirrer were added 1.7 L of sufficiently dehydrated and degassed n-hexane, 59 mmol of triethylaluminum (organoaluminum compound), and 43 mmol of bis(ethylamino)dicyclopentylsilane (silicon compound P). To the autoclave was added 22 g of the solid catalyst component for olefin polymerization D. Then, prepolymerization was performed by continuously supplying 77 g of propylene over about 30 minutes while maintaining the temperature of the autoclave at about 10° C. After that, the obtained slurry was transferred to an SUS 316L autoclave having an internal volume of 160 L and equipped with a stirrer to prepare a slurry further containing 131 L of liquid butane.

[Main Polymerization]

The main polymerization step was performed by polymerization step 1-a1, polymerization step 1-a2, polymerization step 1-a3, polymerization step 1-b, and polymerization step 2 while using an apparatus in which three slurry polymerization reactors and two gas phase polymerization reactors were arranged and connected in series. Specifically, a propylene-based polymer (a), which was an olefin polymer, was produced in the polymerization step 1-a1, the polymerization step 1-a2, and the polymerization step 1-a3 (in the slurry polymerization reactors), and the polymerization step 1-b (in the gas-phase polymerization reactor); the produced propylene-based polymer (a), namely an olefin polymerization catalyst, was transferred to a polymerization reactor of the next stage without deactivating the olefin polymerization catalyst; and a propylene-based copolymer (b), which was an ethylene-propylene copolymer, was then polymerized in the polymerization step 2 (in the gas phase polymerization reactor). Provided that in Examples 11 and 12, the polymerization step 1-a3 was omitted. Hereinafter, the polymerization step 1-a1, the polymerization step 1-a2, the polymerization step 1-a3, the polymerization step 1-b, and the polymerization step 2 will be specifically described.

[Polymerization Step 1-a1] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry containing propylene, hydrogen, triethylaluminum (organoaluminum compound), bis(ethylamino)dicyclopentylsilane (silicon compound P), and the above-described prepolymerization catalyst component as obtained in the prepolymerization step was continuously supplied to a slurry polymerization reactor to perform a polymerization reaction. The reaction conditions were as follows.

Polymerization temperature: 78° C.
Stirring speed: 150 rpm
Liquid level of the slurry polymerization reactor: 18 L
Amount of propylene supplied: 28 kg/hour
Amount of hydrogen supplied: 84.1 NL/hour
Amount of triethylaluminum (organoaluminum compound) supplied: 23.5 mmol/hour
Amount of bis(ethylamino)dicyclopentylsilane (silicon compound P) supplied: 18.2 mmol/hour
Amount of slurry (in terms of solid catalyst component) supplied: 1.03 g/hour
Polymerization pressure: 4.32 MPa (gauge pressure)

[Polymerization Step 1-a2] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a1 was continuously supplied to a slurry polymerization reactor to perform a polymerization reaction. The reaction conditions were as follows.

Polymerization temperature: 78° C.
Stirring speed: 150 rpm
Liquid level of the slurry polymerization reactor: 44 L
Amount of propylene supplied: 15 kg/hour
Amount of hydrogen supplied: 44.3 NL/hour
Polymerization pressure: 3.87 MPa (gauge pressure)

[Polymerization Step 1-b] (Homopolymerization (Gas Phase Polymerization) of Propylene by Using Gas Phase Polymerization Reactor (Gas Phase Polymerization))

The slurry obtained in the polymerization step 1-a2 was further continuously supplied to a subsequent gas-phase polymerization reactor. The gas-phase polymerization reactor used in the polymerization step 1-b is a reactor including a gas dispersion plate. Propylene and hydrogen were continuously supplied from the lowermost side of the gas-phase polymerization reactor. In this way, a fluidized bed was formed in each reaction zone of multiple stages, the amounts of propylene and hydrogen supplied were controlled so as to keep constant the gas composition and the pressure, and propylene was further subjected to homopolymerization while the excess gas was purged. The reaction conditions were as follows.

Polymerization temperature: 80° C.
Polymerization pressure: 1.74 MPa (gauge pressure)
Gas concentration ratio (hydrogen/(hydrogen+propylene)): 5.0 mol %

The intrinsic viscosity [η]PP of the product (propylene-based polymer (a)) sampled from the outlet of the gas-phase polymerization reactor was 0.92 dL/g.

[Polymerization Step 2] (Propylene-Ethylene Copolymerization by Using Gas Phase Polymerization Reactor (Gas Phase Polymerization))

The propylene-based polymer (a) discharged from the gas phase polymerization reactor used in the polymerization step 1-b was further continuously supplied to a subsequent gas phase polymerization reactor. The gas-phase polymerization reactor used in the polymerization step 2 is a reactor including a gas dispersion plate. Propylene, ethylene, and hydrogen were continuously supplied to the gas phase polymerization reactor as configured above. While the gas supply amount was adjusted so as to keep constant the gas composition and the pressure and the excess gas was purged, propylene and ethylene were subjected to copolymerization in the presence of the propylene-based polymer (a) (particles). In this way, an ethylene-propylene copolymer, namely a propylene-based copolymer (b), was generated. Then, a heterophasic propylene polymerization material, which was a mixture of the propylene-based polymer (a) and the propylene-based copolymer (b), was obtained. The reaction conditions were as follows.

Polymerization temperature: 70° C.
Polymerization pressure: 1.25 MPa (gauge pressure)
Gas concentration ratio (ethylene/(propylene+ethylene)): 18.8 mol %
(hydrogen/(hydrogen+propylene+ethylene)): 0.26 mol %

The intrinsic viscosity [η]whole of the product (heterophasic propylene polymerization material) sampled from the outlet of the gas-phase polymerization reactor was 1.54 dL/g.

To the obtained heterophasic propylene polymerization material was added about 100 g/h of water with nitrogen at 60° C. for 2 hours at a flow rate of 20 Nm$^3$/h. In this way, the catalyst component was deactivated, and was further made to pass through nitrogen at 60° C. for 1 hour at a flow rate of 20 Nm$^3$/h for drying. The content (Z2) of the propylene-based copolymer (b) in the heterophasic propylene polymer material obtained by drying was determined by measuring the crystal fusion heat of each of the propylene-based polymer (a) or the whole heterophasic propylene polymer material and then by using the formula below. Here, the crystal fusion heat was measured by differential scanning calorimetry (DSC).

$$X=1-(\Delta Hf)T/(\Delta Hf)P$$

where (ΔHf)T is the fusion heat (J/g) of the whole heterophasic propylene polymerization material; and
(ΔHf)P is the fusion heat (J/g) of propylene-based polymer (a).

The product obtained from the outlet of the gas phase polymerization reactor was a mixture of the propylene-based polymer (a) and the propylene-based copolymer (b). The intrinsic viscosity [η]EP of the propylene-based copolymer (b) was calculated by the following formula:

$$[\eta]EP=([\eta]PP-[\eta]whole \times (1-Z2))/Z2.$$

The obtained heterophasic propylene polymerization material (11) had a cold xylene soluble component amount CXS of 8.29 mass % and a high-boiling-point component amount index of 1347 mass ppm. Further, the percentage of the component having a molecular weight of $10^{4.0}$ or less in terms of polystyrene to the whole as measured by gel permeation chromatography of the heterophasic propylene polymerization material (11) was 7.89%. The heterophasic propylene polymerization material (11) had an ethylene monomer unit content of 4.3 mass % and a propylene monomer unit content of 95.7 mass %. In addition, the content (Z2) of the propylene-based copolymer (b) was 11.2 mass %. The propylene-based copolymer (b) had an ethylene monomer unit content of 38.3 mass %, and had an intrinsic viscosity [η]EP of 6.44 dL/g. The propylene-based polymer (a) had an isotactic pentad fraction of 0.985.

[To Produce Propylene Resin Composition Pellet]

First, 100 parts by mass of the heterophasic propylene polymerization material (11), 0.05 parts by mass of "Calcium Stearate (CAS No. 1592-23-0)" manufactured by Sakai Chemical Industry Co., Ltd., 0.075 parts by mass of "Sumilizer GA-80 (CAS No. 90498-90-1)" manufactured by Sumitomo Chemical Co., Ltd., and "SONGNOX 6260 (CAS No. 26741-53-7)" manufactured by SONGWON were uniformly premixed. Thereafter, the mixture was melt-kneaded under a nitrogen atmosphere under the conditions at an extrusion amount of 85 kg/hour, 180° C., and a screw rotation speed of 280 rpm while using a twin-screw kneading extruder to produce a propylene resin composition pellet (11).

The propylene resin composition pellet (11) had a high-boiling-point component amount index of 901 mass ppm. Further, the percentage of the component having a molecular weight of $10^{4.0}$ or less in terms of polystyrene to the whole as measured by gel permeation chromatography of the propylene resin composition pellet (11) was 8.82%.

[Molding]

The propylene resin composition pellet (11) was supplied to an "SE130-type molding machine" manufactured by Sumitomo Heavy Industries, Ltd., and molded into a flat plate having a length of 150 mm, a width of 90 mm, and a thickness of 3.0 mm at a molding temperature of 220° C., a mold cooling temperature of 50° C., and a pressure of 50 MPa. The obtained flat plate was cut into a pellet shape to obtain a molding (11).

The molding (11) had a high-boiling-point component amount index of 862 mass ppm. Further, the percentage of the component having a molecular weight of $10^{4.0}$ or less in terms of polystyrene to the whole as measured by gel permeation chromatography of the molding (11) was 9.31%.

These results are shown in Tables 3 and 4.

<Example 12> To Synthesize Heterophasic Propylene Polymerization Material (12)

[Prepolymerization]

To a stainless steel (SUS) autoclave having an internal volume of 2 L and equipped with a stirrer were added 1.7 L of sufficiently dehydrated and degassed n-hexane, 60 mmol of triethylaluminum (organoaluminum compound), and 43 mmol of bis(ethylamino)dicyclopentylsilane (silicon compound P). To the autoclave was added 22 g of the solid catalyst component for olefin polymerization D. Then, prepolymerization was performed by continuously supplying 77 g of propylene over about 30 minutes while maintaining the temperature of the autoclave at about 10° C. After that, the obtained slurry was transferred to an SUS 316L autoclave having an internal volume of 160 L and equipped with a stirrer to prepare a slurry further containing 131 L of liquid butane.

[Main Polymerization]
<Polymerization Step 1-a1> (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry containing propylene, hydrogen, triethylaluminum (organoaluminum compound), bis(ethylamino)dicyclopentylsilane (silicon compound P), and the above-described prepolymerization catalyst component as obtained in the prepolymerization step was continuously supplied to a slurry polymerization reactor to perform a polymerization reaction. The reaction conditions were as follows.

Polymerization temperature: 78° C.
Stirring speed: 150 rpm
Liquid level of the slurry polymerization reactor: 18 L
Amount of propylene supplied: 28 kg/hour
Amount of hydrogen supplied: 84.2 NL/hour
Amount of triethylaluminum (organoaluminum compound) supplied: 23.9 mmol/hour
Amount of bis(ethylamino)dicyclopentylsilane (silicon compound P) supplied: 17.9 mmol/hour
Amount of slurry (in terms of solid catalyst component) supplied: 1.00 g/hour
Polymerization pressure: 4.29 MPa (gauge pressure)

[Polymerization Step 1-a2] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a1 was continuously supplied to a slurry polymerization reactor to perform a polymerization reaction. The reaction conditions were as follows.

Polymerization temperature: 78° C.
Stirring speed: 150 rpm
Liquid level of the slurry polymerization reactor: 44 L
Amount of propylene supplied: 15 kg/hour
Amount of hydrogen supplied: 44.5 NL/hour
Polymerization pressure: 3.85 MPa (gauge pressure)

[Polymerization Step 1-b] (Homopolymerization (Gas Phase Polymerization) of Propylene by Using Gas Phase Polymerization Reactor (Gas Phase Polymerization))

The slurry obtained in the polymerization step 1-a2 was further continuously supplied to a subsequent gas-phase polymerization reactor. The gas-phase polymerization reactor used in the polymerization step 1-b is a reactor including a gas dispersion plate. Propylene and hydrogen were continuously supplied from the lowermost side of the gas-phase polymerization reactor. In this way, a fluidized bed was formed in each reaction zone of multiple stages, the amounts of propylene and hydrogen supplied were controlled so as to keep constant the gas composition and the pressure, and propylene was further subjected to homopolymerization while the excess gas was purged. The reaction conditions were as follows.

Polymerization temperature: 80° C.
Polymerization pressure: 1.75 MPa (gauge pressure)
Gas concentration ratio (hydrogen/(hydrogen+propylene)): 5.6 mol %

The intrinsic viscosity [η]PP of the product (propylene-based polymer (a)) sampled from the outlet of the gas-phase polymerization reactor was 0.87 dL/g.

[Polymerization Step 2] (Propylene-Ethylene Copolymerization by Using Gas Phase Polymerization Reactor (Gas Phase Polymerization))

The propylene-based polymer (a) discharged from the gas phase polymerization reactor used in the polymerization step 1-b was further continuously supplied to a subsequent gas phase polymerization reactor. The gas-phase polymerization reactor used in the polymerization step 2 is a reactor including a gas dispersion plate. Propylene, ethylene, and hydrogen were continuously supplied to the gas phase polymerization reactor as configured above. While the gas supply amount was adjusted so as to keep constant the gas composition and the pressure and the excess gas was purged, propylene and ethylene were subjected to copolymerization in the presence of the propylene-based polymer (a) (particles). In this way, an ethylene-propylene copolymer, namely a propylene-based copolymer (b), was generated. Then, a heterophasic propylene polymerization material, which was a mixture of the propylene-based polymer (a) and the propylene-based copolymer (b), was obtained. The reaction conditions were as follows.

Polymerization temperature: 70° C.
Polymerization pressure: 1.25 MPa (gauge pressure)
Gas concentration ratio (ethylene/(propylene+ethylene)): 18.6 mol %
(hydrogen/(hydrogen+propylene+ethylene)): 0.20 mol %

The intrinsic viscosity [η]whole of the product (heterophasic propylene polymerization material) sampled from the outlet of the gas-phase polymerization reactor was 1.62 dL/g.

To the obtained heterophasic propylene polymerization material was added about 100 g/h of water with nitrogen at 60° C. for 2 hours at a flow rate of 20 Nm$^3$/h. In this way, the catalyst component was deactivated, and was further made to pass through nitrogen at 60° C. for 1 hour at a flow rate of 20 Nm$^3$/h for drying. The content (Z2) of the propylene-based copolymer (b) in the heterophasic propylene polymer material obtained by drying and the intrinsic viscosity [η]EP of the propylene-based copolymer (b) were calculated in the same manner as in Example 11.

The obtained heterophasic propylene polymerization material (12) had a cold xylene soluble component amount CXS of 10.26 mass % and a high-boiling-point component amount index of 1342 mass ppm. Further, the percentage of the component having a molecular weight of $10^{4.0}$ or less in terms of polystyrene to the whole as measured by gel permeation chromatography of the heterophasic propylene polymerization material (12) was 0.46%. The heterophasic propylene polymerization material (12) had an ethylene monomer unit content of 4.7 mass % and a propylene monomer unit content of 95.3 mass %. In addition, the content (Z2) of the propylene-based copolymer (b) was 13.3 mass %. The propylene-based copolymer (b) had an ethylene monomer unit content of 35.4 mass %, and had an intrinsic viscosity [η]EP of 6.52 dL/g. The propylene-based polymer (a) had an isotactic pentad fraction of 0.983.

A propylene resin composition pellet (12) and a molding (12) were prepared in the same manner as in Example 11. The propylene resin composition pellet (12) had a high-boiling-point component amount index of 840 mass ppm, and the molding (12) had a high-boiling-point component amount index of 814 mass ppm.

These results are shown in Tables 3 and 4.

<Example 13> To Synthesize Heterophasic Propylene Polymerization Material (13)

[Prepolymerization]

To a stainless steel (SUS) autoclave having an internal volume of 2 L and equipped with a stirrer were added 1.9 L of sufficiently dehydrated and degassed n-hexane, 52 mmol of triethylaluminum (organoaluminum compound), and 6.8 mmol of triethoxyphenylsilane (silicon compound R). To the autoclave was added 19 g of the solid catalyst component for olefin polymerization D. Then, prepolymerization was performed by continuously supplying 68 g of propylene over about 30 minutes while maintaining the temperature of the autoclave at about 10° C. After that, the obtained slurry was transferred to an SUS 316L autoclave having an internal volume of 160 L and equipped with a stirrer to prepare a slurry further containing 130 L of liquid butane.

[Main Polymerization]

<Polymerization Step 1-a1> (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry containing propylene, hydrogen, triethylaluminum (organoaluminum compound), triethoxyphenylsilane (silicon compound R), and the above-described prepolymerization catalyst component as obtained in the prepolymerization step was continuously supplied to a slurry polymerization reactor to perform a polymerization reaction. The reaction conditions were as follows.

Polymerization temperature: 66° C.
Stirring speed: 150 rpm
Liquid level of the slurry polymerization reactor: 18 L
Amount of propylene supplied: 40 kg/hour
Amount of hydrogen supplied: 88.2 NL/hour
Amount of triethylaluminum (organoaluminum compound) supplied: 30.8 mmol/hour
Amount of triethoxyphenylsilane (silicon compound R) supplied: 16.6 mmol/hour
Amount of slurry (in terms of solid catalyst component) supplied: 0.73 g/hour
Polymerization pressure: 4.17 MPa (gauge pressure)

[Polymerization Step 1-a2] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a1 was continuously supplied to a slurry polymerization reactor to perform a polymerization reaction. The reaction conditions were as follows.

Polymerization temperature: 74° C.
Stirring speed: 150 rpm
Liquid level of the slurry polymerization reactor: 44 L
Amount of propylene supplied: 25 kg/hour
Amount of hydrogen supplied: 55.9 NL/hour
Polymerization pressure: 3.83 MPa (gauge pressure)

[Polymerization Step 1-a3] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a2 was continuously supplied to a slurry polymerization reactor to perform a polymerization reaction. The reaction conditions were as follows.

Polymerization temperature: 65° C.
Stirring speed: 150 rpm
Liquid level of the slurry polymerization reactor: 44 L
Amount of propylene supplied: 0 kg/hour
Polymerization pressure: 3.44 MPa (gauge pressure)

[Polymerization Step 1-b] (Homopolymerization (Gas Phase Polymerization) of Propylene by Using Gas Phase Polymerization Reactor (Gas Phase Polymerization))

The slurry obtained in the polymerization step 1-a3 was further continuously supplied to a subsequent gas-phase polymerization reactor. The gas-phase polymerization reactor used in the polymerization step 1-b is a reactor including a gas dispersion plate. Propylene and hydrogen were continuously supplied from the lowermost side of the gas-phase polymerization reactor. In this way, a fluidized bed was formed in each reaction zone of multiple stages, the amounts of propylene and hydrogen supplied were controlled so as to keep constant the gas composition and the pressure, and propylene was further subjected to homopolymerization while the excess gas was purged. The reaction conditions were as follows.

Polymerization temperature: 80° C.
Polymerization pressure: 1.75 MPa (gauge pressure)
Gas concentration ratio (hydrogen/(hydrogen+propylene)): 4.4 mol %

The intrinsic viscosity [η]PP of the product (propylene-based polymer (a)) sampled from the outlet of the gas-phase polymerization reactor was 0.92 dL/g.

[Polymerization Step 2] (Propylene-Ethylene Copolymerization by Using Gas Phase Polymerization Reactor (Gas Phase Polymerization))

The propylene-based polymer (a) discharged from the gas phase polymerization reactor used in the polymerization step 1-b was further continuously supplied to a subsequent gas phase polymerization reactor. The gas-phase polymerization reactor used in the polymerization step 2 is a reactor including a gas dispersion plate. Propylene, ethylene, and hydrogen were continuously supplied to the gas phase polymerization reactor as configured above. While the gas supply amount was adjusted so as to keep constant the gas composition and the pressure and the excess gas was purged, propylene and ethylene were subjected to copolymerization in the presence of the propylene-based polymer (a) (particles). In this way, an ethylene-propylene copolymer, namely a propylene-based copolymer (b), was generated. Then, a heterophasic propylene polymerization material, which was a mixture of the propylene-based polymer (a) and the propylene-based copolymer (b), was obtained. The reaction conditions were as follows.

Polymerization temperature: 70° C.
Polymerization pressure: 1.25 MPa (gauge pressure)
Gas concentration ratio (ethylene/(propylene+ethylene)): 15.7 mol %
(hydrogen/(hydrogen+propylene+ethylene)): 0.20 mol %

The intrinsic viscosity [η]whole of the product (heterophasic propylene polymerization material) sampled from the outlet of the gas-phase polymerization reactor was 1.57 dL/g.

To the obtained heterophasic propylene polymerization material was added about 100 g/h of water with nitrogen at 60° C. for 2 hours at a flow rate of 20 Nm³/h. In this way, the catalyst component was deactivated, and was further made to pass through nitrogen at 60° C. for 1 hour at a flow rate of 20 Nm³/h for drying. The content (Z2) of the propylene-based copolymer (b) in the heterophasic propylene polymer material obtained by drying and the intrinsic viscosity [η]EP of the propylene-based copolymer (b) were calculated in the same manner as in Example 11.

The obtained heterophasic propylene polymerization material (13) had a cold xylene soluble component amount CXS of 12.45 mass % and a high-boiling-point component amount index of 1193 mass ppm. Further, the percentage of the component having a molecular weight of $10^{4.0}$ or less in terms of polystyrene to the whole as measured by gel permeation chromatography of the heterophasic propylene polymerization material (13) was 8.24%. The heterophasic propylene polymerization material (13) had an ethylene monomer unit content of 5.0 mass % and a propylene monomer unit content of 95.0 mass %. In addition, the content (Z2) of the propylene-based copolymer (b) was 15.6 mass %. The propylene-based copolymer (b) had an ethylene monomer unit content of 32.1 mass %, and had an intrinsic viscosity [η]EP of 5.09 dL/g. The propylene-based polymer (a) had an isotactic pentad fraction of 0.976.

A propylene resin composition pellet (13) and a molding (13) were prepared in the same manner as in Example 11. The propylene resin composition pellet (13) had a high-boiling-point component amount index of 924 mass ppm, and the molding (13) had a high-boiling-point component amount index of 781 mass ppm.

These results are shown in Tables 3 and 4.

<Comparative Example 11> To Synthesize Heterophasic Propylene Polymerization Material (C11)

[Prepolymerization]

To a stainless steel (SUS) autoclave having an internal volume of 2 L and equipped with a stirrer were added 1.6 L of sufficiently dehydrated and degassed n-hexane, 40 mmol of triethylaluminum (organoaluminum compound), and 1 mmol of tert-butyl-n-propyl-dimethoxysilane (silicon compound T). To the autoclave was added 14 g of the solid catalyst component for olefin polymerization B. Then, prepolymerization was performed by continuously supplying 49 g of propylene over about 30 minutes while maintaining the temperature of the autoclave at about 10° C. After that, the obtained slurry was transferred to an SUS 316L autoclave having an internal volume of 160 L and equipped with a stirrer to prepare a slurry further containing 130 L of liquid butane.

[Main Polymerization]

<Polymerization Step 1-a1> (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry containing propylene, hydrogen, triethylaluminum (organoaluminum compound), tert-butyl-n-propyl-dimethoxysilane (silicon compound T), and the above-described prepolymerization catalyst component as obtained in the prepolymerization step was continuously supplied to a slurry polymerization reactor to perform a polymerization reaction. The reaction conditions were as follows.

Polymerization temperature: 66° C.
Stirring speed: 150 rpm
Liquid level of the slurry polymerization reactor: 18 L
Amount of propylene supplied: 23 kg/hour
Amount of hydrogen supplied: 126.5 NL/hour
Amount of triethylaluminum (organoaluminum compound) supplied: 28.5 mmol/hour
Amount of tert-butyl-n-propyl-dimethoxysilane (silicon compound T) supplied: 8.5 mmol/hour
Amount of slurry (in terms of solid catalyst component) supplied: 0.53 g/hour
Polymerization pressure: 4.30 MPa (gauge pressure)

[Polymerization Step 1-a2] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a1 was continuously supplied to a slurry polymerization reactor to perform a polymerization reaction. The reaction conditions were as follows.

Polymerization temperature: 73° C.
Stirring speed: 150 rpm
Liquid level of the slurry polymerization reactor: 44 L
Amount of propylene supplied: 15 kg/hour
Amount of hydrogen supplied: 86.1 NL/hour
Polymerization pressure: 3.94 MPa (gauge pressure)

[Polymerization Step 1-a3] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a2 was continuously supplied to a slurry polymerization reactor to perform a polymerization reaction. The reaction conditions were as follows.

Polymerization temperature: 65° C.
Stirring speed: 150 rpm
Liquid level of the slurry polymerization reactor: 44 L
Amount of propylene supplied: 4 kg/hour
Polymerization pressure: 3.60 MPa (gauge pressure)

[Polymerization Step 1-b] (Homopolymerization (Gas Phase Polymerization) of Propylene by Using Gas Phase Polymerization Reactor (Gas Phase Polymerization))

The slurry obtained in the polymerization step 1-a3 was further continuously supplied to a subsequent gas-phase polymerization reactor. The gas-phase polymerization reactor used in the polymerization step 1-b is a reactor including a gas dispersion plate. Propylene and hydrogen were continuously supplied from the lowermost side of the gas-phase polymerization reactor. In this way, a fluidized bed was formed in each reaction zone of multiple stages, the amounts of propylene and hydrogen supplied were controlled so as to keep constant the gas composition and the pressure, and propylene was further subjected to homopolymerization while the excess gas was purged. The reaction conditions were as follows.

Polymerization temperature: 80° C.
Polymerization pressure: 1.74 MPa (gauge pressure)
Gas concentration ratio (hydrogen/(hydrogen+propylene)): 7.8 mol %

The intrinsic viscosity $[\eta]PP$ of the product (propylene-based polymer (a)) sampled from the outlet of the gas-phase polymerization reactor was 0.90 dL/g.

[Polymerization Step 2] (Propylene-Ethylene Copolymerization by Using Gas Phase Polymerization Reactor (Gas Phase Polymerization))

The propylene-based polymer (a) discharged from the gas phase polymerization reactor used in the polymerization step 1-b was further continuously supplied to a subsequent gas phase polymerization reactor. The gas-phase polymerization reactor used in the polymerization step 2 is a reactor including a gas dispersion plate. Propylene, ethylene, and hydrogen were continuously supplied to the gas phase polymerization reactor as configured above. While the gas supply amount was adjusted so as to keep constant the gas composition and the pressure and the excess gas was purged, propylene and ethylene were subjected to copolymerization in the presence of the propylene-based polymer (a) (particles). In this way, an ethylene-propylene copolymer, namely a propylene-based copolymer (b), was generated. Then, a heterophasic propylene polymerization material, which was a mixture of the propylene-based polymer (a) and the propylene-based copolymer (b), was obtained. The reaction conditions were as follows.

Polymerization temperature: 70° C.
Polymerization pressure: 1.25 MPa (gauge pressure)
Gas concentration ratio (ethylene/(propylene+ethylene)): 25.9 mol %
(hydrogen/(hydrogen+propylene+ethylene)): 0.27 mol %

The intrinsic viscosity $[\eta]$whole of the product (heterophasic propylene polymerization material) sampled from the outlet of the gas-phase polymerization reactor was 1.71 dL/g.

To the obtained heterophasic propylene polymerization material was added about 100 g/h of water with nitrogen at 60° C. for 2 hours at a flow rate of 20 Nm$^3$/h. In this way, the catalyst component was deactivated, and was further made to pass through nitrogen at 60° C. for 1 hour at a flow rate of 20 Nm$^3$/h for drying. The content (Z2) of the propylene-based copolymer (b) in the heterophasic propylene polymer material obtained by drying and the intrinsic viscosity $[\eta]EP$ of the propylene-based copolymer (b) were calculated in the same manner as in Example 11.

The obtained heterophasic propylene polymerization material (C11) had a cold xylene soluble component amount CXS of 12.25 mass % and a high-boiling-point component amount index of 2009 mass ppm. Further, the percentage of the component having a molecular weight of $10^{4.0}$ or less in terms of polystyrene to the whole as measured by gel permeation chromatography of the heterophasic propylene polymerization material (C11) was 12.55%. The heterophasic propylene polymerization material (C11) had an ethylene monomer unit content of 5.5 mass % and a propylene monomer unit content of 94.5 mass %. In addition, the content (Z2) of the propylene-based copolymer (b) was 14.7 mass %. The propylene-based copolymer (b) had an ethylene monomer unit content of 37.4 mass %, and had an intrinsic viscosity $[\eta]EP$ of 6.41 dL/g. The propylene-based polymer (a) had an isotactic pentad fraction of 0.977.

The propylene resin composition pellet (C11) and the molding (C11) were prepared in the same manner as in Example 11. The propylene resin composition pellet (C11) had a high-boiling-point component amount index of 1700 mass ppm, and the molding (C11) had a high-boiling-point component amount index of 1405 mass ppm.

These results are shown in Tables 3 and 4.

<Comparative Example 12> To Synthesize Heterophasic Propylene Polymerization Material (C12)

[Prepolymerization]

To a stainless steel (SUS) autoclave having an internal volume of 2 L and equipped with a stirrer were added 1.7 L of sufficiently dehydrated and degassed n-hexane, 35 mmol of triethylaluminum (organoaluminum compound), and 4 mmol of tert-butyl-n-propyl-dimethoxysilane (silicon compound T). To the autoclave was added 14 g of the solid catalyst component for olefin polymerization D. Then, prepolymerization was performed by continuously supplying 49 g of propylene over about 30 minutes while maintaining the temperature of the autoclave at about 10° C. After that, the obtained slurry was transferred to an SUS 316L autoclave having an internal volume of 160 L and equipped with a stirrer to prepare a slurry further containing 131 L of liquid butane.

[Main Polymerization]

<Polymerization Step 1-a1> (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry containing propylene, hydrogen, triethylaluminum (organoaluminum compound), tert-butyl-n-propyl-dimethoxysilane (silicon compound T), and the above-described prepolymerization catalyst component as obtained in the prepolymerization step was continuously supplied to a slurry polymerization reactor to perform a polymerization reaction. The reaction conditions were as follows.

Polymerization temperature: 57° C.
Stirring speed: 150 rpm
Liquid level of the slurry polymerization reactor: 18 L
Amount of propylene supplied: 23 kg/hour
Amount of hydrogen supplied: 126.8 NL/hour
Amount of triethylaluminum (organoaluminum compound) supplied: 27.2 mmol/hour
Amount of tert-butyl-n-propyl-dimethoxysilane (silicon compound T) supplied: 7.6 mmol/hour
Amount of slurry (in terms of solid catalyst component) supplied: 0.60 g/hour
Polymerization pressure: 4.08 MPa (gauge pressure)

[Polymerization Step 1-a2] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a1 was continuously supplied to a slurry polymerization reactor to perform a polymerization reaction. The reaction conditions were as follows.

Polymerization temperature: 57° C.
Stirring speed: 150 rpm
Liquid level of the slurry polymerization reactor: 44 L
Amount of propylene supplied: 15 kg/hour
Amount of hydrogen supplied: 82.5 NL/hour
Polymerization pressure: 3.39 MPa (gauge pressure)

[Polymerization Step 1-a3] (Homopolymerization of Propylene by Using Slurry Polymerization Reactor)

Propylene was subjected to homopolymerization using a vessel-type slurry polymerization reactor made of SUS 304 and equipped with a stirrer. Specifically, the slurry obtained in the polymerization step 1-a2 was continuously supplied to a slurry polymerization reactor to perform a polymerization reaction. The reaction conditions were as follows.

Polymerization temperature: 50° C.
Stirring speed: 150 rpm
Liquid level of the slurry polymerization reactor: 44 L
Amount of propylene supplied: 0 kg/hour
Polymerization pressure: 3.16 MPa (gauge pressure)

[Polymerization Step 1-b] (Homopolymerization (Gas Phase Polymerization) of Propylene by Using Gas Phase Polymerization Reactor (Gas Phase Polymerization))

The slurry obtained in the polymerization step 1-a3 was further continuously supplied to a subsequent gas-phase polymerization reactor. The gas-phase polymerization reactor used in the polymerization step 1-b is a reactor including a gas dispersion plate. Propylene and hydrogen were continuously supplied from the lowermost side of the gas-phase polymerization reactor. In this way, a fluidized bed was formed in each reaction zone of multiple stages, the amounts of propylene and hydrogen supplied were controlled so as to keep constant the gas composition and the pressure, and propylene was further subjected to homopolymerization while the excess gas was purged. The reaction conditions were as follows.

Polymerization temperature: 80° C.
Polymerization pressure: 1.75 MPa (gauge pressure)
Gas concentration ratio (hydrogen/(hydrogen+propylene)): 10.9 mol %

The intrinsic viscosity $[\eta]PP$ of the product (propylene-based polymer (a)) sampled from the outlet of the gas-phase polymerization reactor was 0.86 dL/g.

[Polymerization Step 2] (Propylene-Ethylene Copolymerization by Using Gas Phase Polymerization Reactor (Gas Phase Polymerization))

The propylene-based polymer (a) discharged from the gas phase polymerization reactor used in the polymerization step 1-b was further continuously supplied to a subsequent gas phase polymerization reactor. The gas-phase polymerization reactor used in the polymerization step 2 is a reactor including a gas dispersion plate. Propylene, ethylene, and hydrogen were continuously supplied to the gas phase polymerization reactor as configured above. While the gas supply amount was adjusted so as to keep constant the gas composition and the pressure and the excess gas was purged, propylene and ethylene were subjected to copolymerization in the presence of the propylene-based polymer (a) (particles). In this way, an ethylene-propylene copolymer, namely a propylene-based copolymer (b), was generated. Then, a heterophasic propylene polymerization material, which was a mixture of the propylene-based polymer (a) and the propylene-based copolymer (b), was obtained. The reaction conditions were as follows.

Polymerization temperature: 70° C.
Polymerization pressure: 1.250 MPa (gauge pressure)
Gas concentration ratio (ethylene/(propylene+ethylene)): 22.9 mol %
(hydrogen/(hydrogen+propylene+ethylene)): 0.11 mol %

The intrinsic viscosity $[\eta]$whole of the product (heterophasic propylene polymerization material) sampled from the outlet of the gas-phase polymerization reactor was 1.77 dL/g.

To the obtained heterophasic propylene polymerization material was added about 100 g/h of water with nitrogen at 60° C. for 2 hours at a flow rate of 20 Nm³/h. In this way, the catalyst component was deactivated, and was further made to pass through nitrogen at 60° C. for 1 hour at a flow rate of 20 Nm³/h for drying. The content (Z2) of the propylene-based copolymer (b) in the heterophasic propylene polymer material obtained by drying and the intrinsic viscosity $[\eta]EP$ of the propylene-based copolymer (b) were calculated in the same manner as in Example 11.

The obtained heterophasic propylene polymerization material (C12) had a cold xylene soluble component amount CXS of 12.66 mass % and a high-boiling-point component amount index of 1852 mass ppm. Further, the percentage of the component having a molecular weight of $10^{4.0}$ or less in terms of polystyrene to the whole as measured by gel permeation chromatography of the heterophasic propylene polymerization material (C12) was 7.53%. The heterophasic propylene polymerization material (C12) had an ethylene monomer unit content of 4.9 mass % and a propylene monomer unit content of 95.1 mass %. In addition, the content (Z2) of the propylene-based copolymer (b) was 13.4 mass %. The propylene-based copolymer (b) had an ethylene monomer unit content of 36.6 mass %, and had an intrinsic viscosity $[\eta]EP$ of 7.66 dL/g. The propylene-based polymer (a) had an isotactic pentad fraction of 0.980.

The propylene resin composition pellet (C12) was prepared in the same manner as in Example 11. The propylene resin composition pellet (C12) had a high-boiling-point component amount index of 1774 mass ppm.

These results are shown in Tables 3 and 4.

TABLE 3

| | Solid catalyst component for olefin polymerization | Silicon compound | X2 (mass %) | Y2 (%) | Z2 (mass %) | (X2 × Y2)/Z2 (—) | High-boiling-point component amount index (mass ppm) |
|---|---|---|---|---|---|---|---|
| Example 11 | D | p | 8.29 | 7.89 | 11.2 | 5.82 (Heterophasic propylene polymerization material) 6.51 (Propylene resin composition pellet) 6.87 (Molding) | 1347 (Heterophasic propylene polymerization material) 901 (Propylene resin composition pellet) 862 (Molding) |
| Example 12 | D | p | 10.26 | 0.46 | 13.3 | 0.35 (Heterophasic propylene polymerization material) | 1342 (Heterophasic propylene polymerization material) 840 (Propylene resin composition pellet) 814 (Molding) |
| Example 13 | D | R | 12.45 | 8.24 | 15.6 | 6.58 (Heterophasic propylene polymerization material) | 1193 (Heterophasic propylene polymerization material) 924 (Propylene resin composition pellet) 781 (Molding) |
| Comparative Example 11 | B | T | 12.25 | 12.55 | 14.7 | 10.46 (Heterophasic propylene polymerization material) | 2009 (Heterophasic propylene polymerization material) 1700 (Propylene resin composition pellet) 1405 (Molding) |
| Comparative Example 12 | D | T | 12.66 | 7.53 | 13.4 | 7.11 (Heterophasic propylene polymerization material) | 1852 (Heterophasic propylene polymerization material) 1774 (Propylene resin composition pellet) |

X2: Cold xylene soluble component amount (CXS) of heterophasic propylene polymerization material
Y2: Percentage of a component having a molecular weight of $10^{4.0}$ or less in terms of polystyrene and contained in a cold xylene soluble component of the heterophasic propylene polymerization material based on all components of the cold xylene soluble component of the heterophasic propylene polymerization material as measured by gel permeation chromatography
Z2: Propylene-based copolymer (b)

TABLE 4

| | [η] whole (dL/g) | [η] PP (dL/g) | [η] EP (dL/g) | Ethylene monomer unit (mass %) in propylene-based copolymer b | [mmmm] (—) of propylene-based polymer a |
|---|---|---|---|---|---|
| Example 11 | 1.54 | 0.92 | 6.44 | 38.3 | 0.985 |
| Example 12 | 1.62 | 0.87 | 6.52 | 35.4 | 0.983 |
| Example 13 | 1.57 | 0.92 | 5.09 | 32.1 | 0.976 |
| Comparative Example 11 | 1.71 | 0.90 | 6.41 | 37.4 | 0.977 |
| Comparative Example 12 | 1.77 | 0.86 | 7.66 | 36.6 | 0.980 |

As can be understood from the results described in Table 3, the heterophasic propylene polymerization material of any of Examples 11 to 13 has a smaller high-boiling-point component amount index than that of any of Comparative Examples 11 to 12, and therefore has a lower resin odor.

The high-boiling-point component amount index of the heterophasic propylene polymerization material (Examples 11 to 13) is compared with the high-boiling-point component amount index of the olefin polymer (Comparative Examples 1 to 7). Here, there are cases of "Example (heterophasic propylene polymerization material)>Comparative Example (olefin polymer)". This is because the heterophasic propylene polymerization material has a larger content of the amorphous component and the volatile component in the sample easily leaks to the outside of the sample, so that the high-boiling-point component amount index tends to be larger than that of the olefin polymer.

The olefin polymer of the present invention has an excellent feature where the melting point is not increased although the resin odor is low and the high-boiling-point component amount index is small. Therefore, the present invention is suitably used for applications such as various automobile interior and exterior parts (e.g., an instrument panel containing an injection molding material, a glove box, a trim material, a housing material, a pillar, a bumper, a fender, a rear door) as well as various parts of home appliances, various housing equipment parts, various industrial parts, and/or various building material parts. The present invention is thus highly applicable to various fields of industries such as transport machine industry, electrical and electronic industry, and building and construction industry.

What is claimed is:
1. A heterophasic propylene polymerization material that satisfies the following formula (3):

$$(X2 \times Y2)/Z2 \leq 7.0 \quad (3)$$

wherein
X2 represents a cold xylene soluble component amount (mass %) of the heterophasic propylene polymerization material;
Y2 represents a percentage (%) of a component having a molecular weight of 104.0 or less in terms of polystyrene and contained in a cold xylene soluble component of the heterophasic propylene polymerization material based on all components of the cold xylene soluble component of the heterophasic propylene polymerization material as measured by gel permeation chromatography; and
Z2 represents a content (mass %) of a propylene-based copolymer contained in the heterophasic propylene polymerization material and containing a propylene-derived monomer unit and a monomer unit derived from at least one compound selected from the group consisting of ethylene and $C_{4-12}$ α-olefins.

2. The heterophasic propylene polymerization material according to claim 1, which satisfies the following formula (4):

$$0.3 < (X2 \times Y2)/Z2 < 7.0 \qquad (4)$$

wherein X2, Y2, and Z2 have the same meanings as described above.

3. The heterophasic propylene polymerization material according to claim 1, comprising:
   (a) a propylene-based polymer containing 80 mass % or more of propylene-derived monomer unit and having an intrinsic viscosity of 2.0 dL/g or less; and
   (b) a propylene-based copolymer containing a propylene-derived monomer unit and 30 to 55 mass % of a monomer unit derived from at least one compound selected from the group consisting of ethylene and $C_{4-12}$ α-olefins and having an intrinsic viscosity of from 1.5 to 8.0 dL/g.

4. The heterophasic propylene polymerization material according to claim 3, wherein the propylene-based polymer (a) has a content of from 50 to 90 mass %, and the propylene-based copolymer (b) has a content of from 10 to 50 mass %.

5. The heterophasic propylene polymerization material according to claim 3, wherein the propylene-based polymer (a) has an isotactic pentad fraction of more than 0.975.

6. An olefin polymer that satisfies the following formula (1):

$$Y1/X1 \leq 40 \qquad (1)$$

wherein
X1 represents a cold xylene soluble component amount (mass %) of the olefin polymer; and
Y1 represents a percentage (%) of a component having a molecular weight of 103.5 or less in terms of polystyrene and contained in a cold xylene soluble component of the olefin polymer based on all components of the cold xylene soluble component of the olefin polymer as measured by gel permeation chromatography.

7. The olefin polymer according to claim 6, which satisfies the following formula (2):

$$5.3 < Y1/X1 < 40 \qquad (2)$$

wherein X1 and Y1 have the same meanings as described above.

8. The olefin polymer according to claim 6, which is a propylene polymer.

9. The olefin polymer according to claim 8, which is a propylene homopolymer.

* * * * *